United States Patent [19]

Welch et al.

[11] 4,336,421
[45] Jun. 22, 1982

[54] APPARATUS AND METHOD FOR RECOGNIZING SPOKEN WORDS

[75] Inventors: John R. Welch, Riverton; Sheldon C. Oxenberg, Cherry Hill, both of N.J.

[73] Assignee: Threshold Technology, Inc., Delran, N.J.

[21] Appl. No.: 138,643

[22] Filed: Apr. 8, 1980

[51] Int. Cl.³ .............................................. G10L 1/00
[52] U.S. Cl. .................................................. 179/1 SD
[58] Field of Search ............... 179/1 SD, 1 SB, 1 VC; 340/146.3 WD, 146.3 SG, 148; 364/410, 419, 513

[56] References Cited

U.S. PATENT DOCUMENTS

| | | | |
|---|---|---|---|
| 3,553,372 | 1/1971 | Wright | 179/1 SD |
| 4,059,725 | 11/1977 | Jakoe | 179/1 SD |
| 4,107,460 | 8/1978 | Grunza et al. | 179/1 SD |
| 4,156,868 | 5/1979 | Levinson | 179/1 SD |

OTHER PUBLICATIONS

White et al., "Speech Recognition Experiments etc.", IEEE Trans. on Acoustics, Speech and Sig. Proc., Apr. 1976, pp. 183–188.

Primary Examiner—Errol A. Krass
Assistant Examiner—E. S. Kemeny
Attorney, Agent, or Firm—Martin Novack

[57] ABSTRACT

A speech recognition technique is disclosed for recognizing words that are spoken at speeds that approach the speed of continuous speech.

To avoid the cost of a rigorous approach wherein all possible words of stored vocabulary are correlated against each group of speech samples, this invention uses relatively long duration inter-string pauses to detect string boundaries, and relatively short duration inter-segment pauses to determine speech segment boundaries which are used as a limited number of start or end points.

38 Claims, 39 Drawing Figures

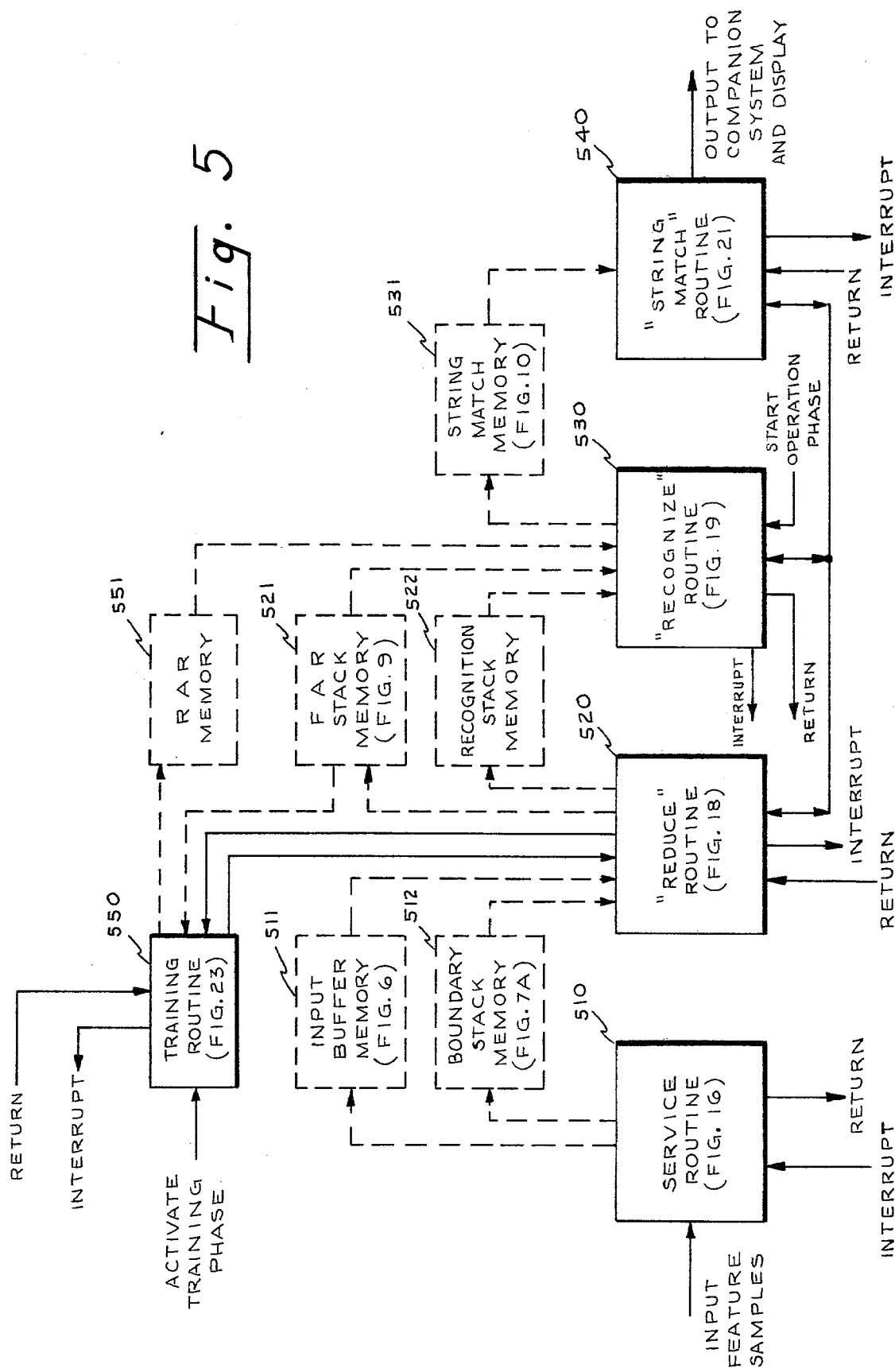

| | ADDRESS | SEGMENTS INCLUDED | "HWRD" | "HCOR" |
|---|---|---|---|---|
| ENDS WITH SEGMENT 1 | 0<br>1<br>2<br>3 | —<br>—<br>—<br>1 | VOCAB. WORD THAT GIVES BEST SCORE ↓ | BEST SCORE ↓ |
| ENDS WITH SEGMENT 2 | 4<br>5<br>6<br>7 | —<br>—<br>1,2<br>2 | | |
| ENDS WITH SEGMENT 3 | 8<br>9<br>10<br>11 | —<br>1,2,3<br>2,3<br>3 | | |
| ENDS WITH SEGMENT 4 | 12<br>13<br>14<br>15 | 1,2,3,4<br>2,3,4<br>3,4<br>4 | | |
| ENDS WITH SEGMENT 5 | 16<br>17<br>18<br>19 | 2,3,4,5<br>3,4,5<br>4,5<br>5 | | |
| ⋮ | ⋮ | ⋮ | ⋮ | ⋮ |
| ENDS WITH SEGMENT 12 | 44<br>45<br>46<br>47 | 9,10,11,12<br>10,11,12<br>11,12<br>12 | | |

531 (STRING MATCH MEMORY)

*Fig. 10*

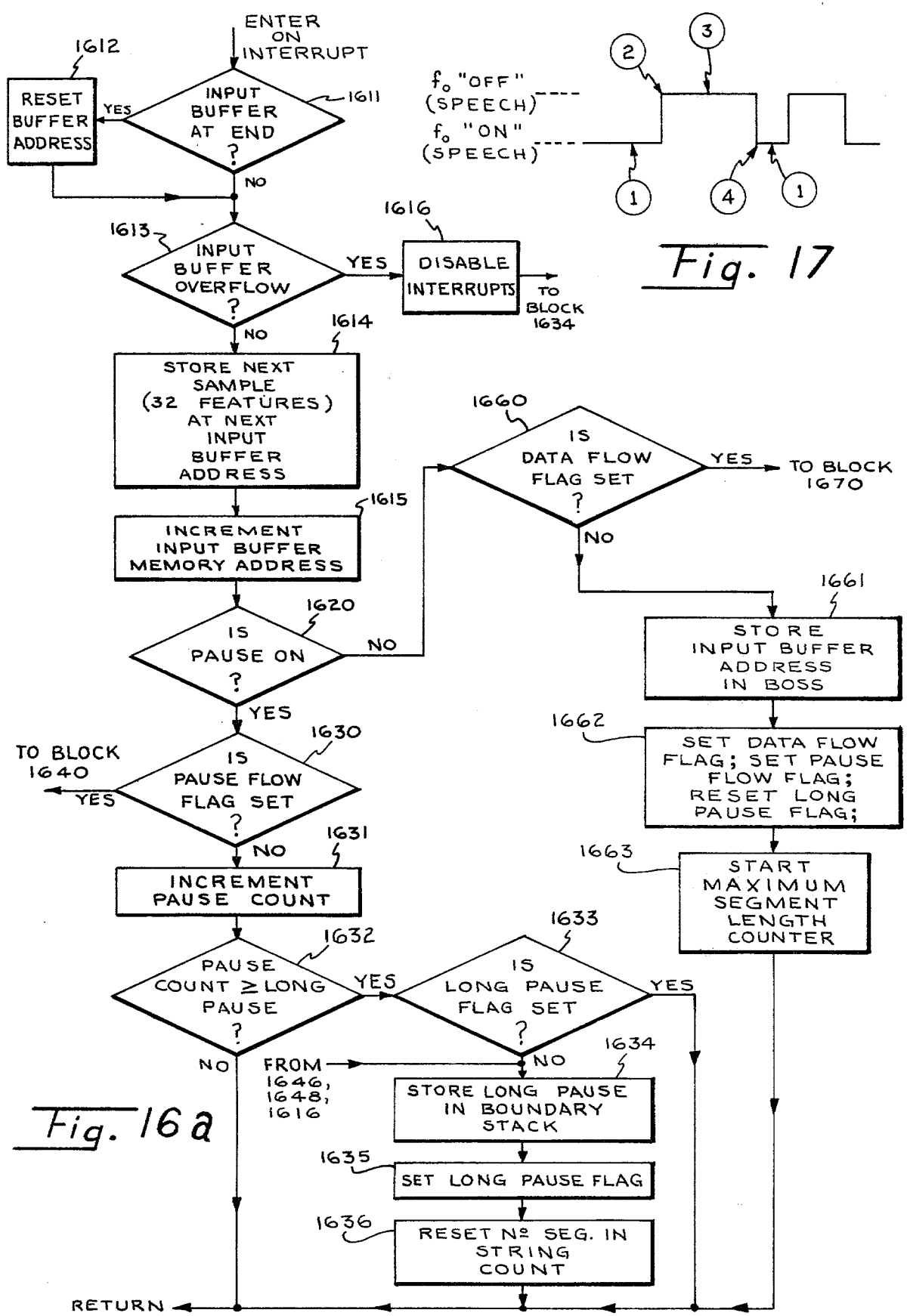

APPARATUS AND METHOD FOR RECOGNIZING SPOKEN WORDS

BACKGROUND OF THE INVENTION

This invention relates to speech recognition techniques and, more particularly, to improved apparatus and method for recognizing words that are spoken at speeds that approach the speed of "continuous" speech. An improved apparatus and method of speech feature array correlation is also set forth. The subject matter of this invention relates to subject matter set forth in the copending U.S. Appl. Ser. No. 138,646, entitled "Speech Recognition Apparatus And Method", filed of even date herewith and assigned to the same assignee as the present application.

There have been previously developed various equipments that recognize limited vocabularies of spoken words by analysis of acoustic events. Typically, such equipments are useful in "voice command" applications wherein, upon recognizing particular words, the equipment produces electrical signals which control the operation of a companion system. For example, a voice command could be used to control a conveyor belt to move in a specified manner or may control a computer to perform specified calculations.

Previous efforts to develop automatic methods of speech recognition, while attaining some success, led to the realization of the exceedingly complex nature of speech communication. Normal speech has a high information content with considerable variability from speaker to speaker and some variability even in the same word when spoken by the same individual. Therefore, a "perfect" recognition scheme is unattainable since the nature of the speech signal to be recognized cannot be precisely defined. As a result, the preferred past schemes have been empirical approaches which have yielded at least a reasonable level of confidence, from a statistical standpoint, that a particular spoken word corresponded to a selected one of a limited machine vocabulary. The desirability of such schemes are thus not determinable by theoretical examination, but rather by a straightforward measure of recognition accuracy over an extended period of operation.

For various reasons, most prior art systems have been found unsuitable for practical applications. One of the prime reasons has been the sheer complexity of equipments that attempted to make an overly rigorous analysis of received speech signals. In addition to the expense and appurtenant unreliability, such systems have a tendency to establish highly complicated and restrictive recognition criteria that may reject normal variations of the system vocabulary words. Conversely, some equipments suffer from establishing recognition criteria that are too easily met and result in the improper acceptance of extraneous words not included in the preselected vocabulary of the equipment.

In the U.S. Pat. No. 4,069,393, assigned to the same assignee as the present application, there is disclosed an apparatus which receives spoken input "training" words and a subsequent spoken input "command" word and generates a correlation function that is indicative of the resemblance of the command word to each training word. A feature extraction means processes received input words and generates digital feature output signals on particular ones of a number of feature output lines, the particular ones depending on the characteristic features of the word being spoken. The status of the feature signals which occur during each training word are stored as a time normalized matrix or array. Subsequently, the status of the feature signals which occur during a command word are also stored as a time normalized array. The command word array is then compared, member by member, with each training word array and a correlation figure is generated for each comparison. If a sufficiently high correlation is found between the command word array and a particular training word array, the command word is deemed to correspond to the particular training word. Existing versions of this type of system have been found to operate most satisfactorily in applications where command words are spoken in "isolation"; i.e., where there are very distinct pauses (e.g. of the order of hundreds of milliseconds), between words, the pauses defining the word boundaries. Generally, circuitry is provided which senses the onset of speech after a pause and which then senses the next substantial absence of speech. These occurrences are considered the boundaries of a word and the feature events which occur between these boundaries are used to form the array referred to above. While this type of system has achieved commercial acceptance, the informational entry rate is necessarily limited, and the speakers must be trained to provide the required relatively long pauses between words, or else recognition errors will occur at an unacceptable rate.

In the U.S. Pat. No. 3,883,850 assigned to the same assignee as the present application, there is described a type of system that has been employed in the past with limited success to recognize the occurrence of words during continuous or connected speech. The technique utilized is a sequential analysis of phonetic events. A sequential logic "chain" is provided for each word to be recognized. Each chain includes a number of logic stages, one stage being provided for each phonetic event of the word to be recognized. The logic stages are configured in a series arrangement and selectively enabled in such a manner that they are sequentially activated when a particular sequence of phonetic events (or features) occurs. As a simplified example, the word "red" can be expressed by the phonetic sequence /r/→/ϵ/→/d/. Accordingly, a logic chain employed to recognize the word red would have three logic stages coupled in series, the first stage being enabled by the sensing of an /r/ sound, the second stage being enabled by the sensing of an /ϵ/ sound and the third stage being enabled by the sensing of a /d/ sound. Of course, the second and third stages would each also require the prior stage to have been enabled as a precondition. When the last stage is enabled, the system indicates that the word red has been spoken since the phonemes /r/, /ϵ/, and /d/ are known to have occurred in the listed order. As explained in abovereferenced patents, the system typically requires that the phonemes occur within certain time constraints and provides for a logic chain to be "reset" (i.e., start over from scratch in looking for its vocabulary word) upon occurrence of certain acoustic features which would indicate a strong improbability that the sought vocabulary word is being uttered.

It will be appreciated that the sequential logic type of system as described has capability of recognizing vocabulary words among continuous speech, even when there is no discernable pause before or after the word is spoken. This is because the system is designed to sense the occurrence of a particular sequence of phonemes and no word boundaries need occur to isolate the word so an analysis can be made. Notwithstanding this advantage, it has been found that the described type of sequential logic system has certain deficiencies in the present state of the art. In general terms, speech recognition systems sometimes establish an overly restrictive recognition criteria, and this is often the case with the sequential logic type of system. Specifically, if the sequential logic system requires a certain restrictive sequence of phonemes for recognition, the absence of even a single phoneme from the prescribed sequence will prevent a recognition indication. In may cases such restriction causes a sought word to go unrecognized since contextual effects can easily cause even the same speaker to extraneously insert or omit a phoneme (or, more precisely, a phonetic feature) when uttering the same word on different occasions. This type of error lowers the system's recognition rate. The recognition rate can obviously be raised by relaxing the recognition criteria and allowing various alternative sequences to trigger recognition indications. However, such relaxation is found to increase the occurrence of "false alarms"; i.e., false triggerings of recognition indications by words (or phonetic sequences in adjacent words) that are similar to a word being sought.

In the U.S. Pat. No. 3,943,295 and 4,107,460, assigned to the same assignee as the present invention, there are disclosed improved techniques of recognizing one or more words from among continuous speech wherein a sequential type of analysis is employed to determine the boundaries of a command word candidate, and then the speech features which occur between the boundaries are correlated against stored speech features, using an array comparison of the type mentioned above in conjunction with "isolated" speech recognition systems. In the latter patent, the sequential processing includes comparing feature subsets of received speech with stored feature subsets of vocabulary words in order to determine the boundaries of command word candidates. While the techniques of these patents are promising, the type of processing used therein has not, in the present state of the art, been successfully employed for continuous speech recognition of significant vocabulary sizes.

It has been proposed that continuous speech could be processed by considering each speech sample (i.e., sample of speech features taken at regular time intervals) of a length of speech as a possible start or end point of an individual vocabulary word. All possible words of the system's vocabulary are correlated against each group of speech samples. In other words, each vocabulary word is correlated against the speech samples comprising each possible word position within the length of speech being processed. Once this has been done, the correlation scores can be used to select an optimum sequence of vocabulary words which best matches the continuous speech being processed. A problem, however, with such a rigorous approach is the cost and/or processing time involved when the number of possible start and end points becomes large, as will occur for continuous lengths of speech that includes a sequence of only a few words.

It is among the objects of the invention to provide the following:

(a) A practical apparatus and method for recognizing strings of words that are spoken at a rate faster than was possible in prior "isolated" word recognition systems and which approaches the speed of continuous speech.

(b) An apparatus having defined operational units, with associated memory, that perform on a priority basis that renders practical the processing of speech that is continuous or almost continuous in nature.

(c) An improved apparatus and method of speech feature array correlation that has application in both "isolated" word types of speech recognition systems and to "continuous", or almost continuous speech recognition systems.

SUMMARY OF THE INVENTION

In accordance with one aspect of the invention there is disclosed an apparatus and method for receiving input spoken vocabulary words during a training phase of operation and for subsequently recognizing strings of received input spoken words. As used herein, a "string" of spoken words is a sequence of spoken words preceded and followed by a pause (absence of speech) of relatively long duration, and sometimes referred to as a "long pause". In the embodiment described below, a long pause has a duration of at least 132 milliseconds. The present invention operates best when the sequence of words spoken within a string are separated by short but distinct pauses, this type of speech sometimes being referred to herein as "semi-connected" speech. As will become clear hereinbelow, the invented apparatus and technique performs processing based on individual speech segments within a string, and until the final phase of processing (called "string matching"), it is not necessary to distinguish between short pauses that occur between individual words of a string (inter-word pauses) and short pauses that occur within individual words of a string (intra-word pauses). As used herein, the term "short pause" refers to an absence of speech for a relatively short duration (i.e., relative to the previously mentioned "long pause"), a short pause in the embodiment described below having a duration of at least about 10 milliseconds. Accordingly, an important advantage of the present invention is the elimination of the need for relatively long pauses between the words of a sequence or string of words. The present invention operates at optimum efficiency when a short but distinct pause is provided between words of a string. It will be recognized that even in continuous speech there is often a short pause which naturally occurs between successively spoken words. To the extent that such natural separation of adjacent words is present in continuous speech, the present invention will be effective in recognizing a string of words spoken continuously. However, it will be understood that continuously spoken words can sometimes tend to run together without any discernable pause between the successive words (an example being when a word ends in a sound which is the same as the beginning sound of the next word). Applicants have found that speakers can be readily trained to use semi-connected speech at rates that approach the rate of continuously spoken speech and which are much faster than the rate of speaking individual words in complete "isolation".

In accordance with the apparatus of the invention, a feature extraction means is provided for generating digital feature signals dependent on the features present in input words. Reference array formation means are provided for forming and storing, for each vocabulary word of the system, a time-normalized "reference array" that has array members that are dependent on the feature signals present during the vocabulary word as spoken during the training phase. As will be described hereinbelow, each vocabulary word is preferably uttered a number of times during the training phase, and information from the number of utterances is used in forming each vocabulary word reference array. Boundary detection means are provided for detecting boundaries defining the beginning and end of a string of speech and for also detecting boundaries between speech segments within the string. The boundary detection means is operative to detect relatively long duration pauses between speech sounds, these being the inter-string pauses from which string boundaries are determined. The boundary detection is also operative to detect relatively short duration pauses between speech sounds, these being the inter-segment pauses from which speech segment boundaries are determined. Candidate feature array formation means are provided for forming and storing, for each command word candidate, a time-normalized candidate feature array having array members that are dependent upon the feature signals present during each such command word candidate. In the preferred embodiment, the candidate feature array formation means is operative to form a candidate feature array for each of the following: a command word candidate consisting of each individual speech segment considered as a one-segment word; a command word candidate consisting of each individual speech segment together with the previous speech segment, if any, considered as a two-segment word; a command word candidate consisting of each individual speech segment together with the previous two speech segments, if any, considered as a threesegment word; and a command word candidate consisting of each individual speech segment together with the previous three speech segments, if any, considered as a four segment word. Thus, it is seen that within each string of speech, a timenormalized candidate feature array is formed for individual speech segments as well as for sequences of up to four speech segments. (In the present embodiment the vocabulary words are allowed to have up to four segments.) As previously noted, at this point in the processing, no attempt is made to distinguish between inter-word pauses and intra-word pauses. Thus, adjacent sequences of up to four segments are considered as possibly being segments of a single word. Array correlation means are provided for comparing each candidate feature array with each reference array and for storing, for each command word candidate, the vocabulary word whose reference array results in the highest correlation. A record of the score of said highest correlation is also stored. A string matching means is then responsive to the stored correlation scores, as well as to the stored vocabulary words which yielded said correlation scores, for determining the sequence of vocabulary words that yield the highest overall correlation score for the string. Finally, means are provided for generating output indications of the determined sequence of vocabulary words.

In the preferred embodiment of the invention, the array formation means, the array correlation means, and the string matching means are operative to function one at a time on a priority basis, with the array formation means having a higher operational priority than the array correlation means, and the array correlation means having a higher operational priority than the string matching means. First-in-first-out memory stacks are used for storing detected boundaries and command word candidate feature arrays.

In accordance with a further aspect of the present invention, there is disclosed a speech recognition apparatus and method which employs an improved technique of speech feature array formation and comparison and thereby allows speech recognition to be performed with higher accuracy. In general terms, the technique is used in an apparatus which receives input spoken vocabulary words during a training phase of operation and subsequently recognizes input spoken command words. The technique is applicable to various types of speech recognition equipments, including "isolated word", "continuous speech" and "semi-connected speech" recognition systems. As in the system described above, a feature extraction means is generally provided to process received input words and generate digital feature signals dependent upon the features present in the received input words. Means are provided for forming, for each vocabulary word, a time-normalized reference array having digital information at each array position representative of the presence or absence of a particular feature signal at a particular time slot during at least a predetermined fraction of a number of training utterances of the vocabulary word. The digital information at each array position is also representative of the consistency of occurrence of the particular feature signal at the particular time slot during said number of training utterances of the vocabulary word. Means are also provided for forming a time-normalized command word feature array having digital information at each array position representative of the presence or absence of a particular feature signal at a particular time slot during the command word. Further means are provided for comparing, member-by-member, the command word feature array with the reference array for each vocabulary word. Finally, means are provided for selecting the vocabulary word whose reference array yields the highest correlation with the command word feature array.

In the preferred embodiment of this form of the invention, the reference array for each vocabulary word includes two binary bits at each array position. One of the binary bits represents the presence or absence of a particular feature at a particular time slot, and the other of the binary bits represents the consistency of presence or absence of the particular feature at the particular time slot. In the command word feature array, a single binary bit, at each array position, represents the presence or absence of a particular feature at a particular time slot. Further, in the preferred embodiment of this form of the invention, the means for performing member-by-member comparison includes means for comparing each presence or absence indicative bit of the command word feature array with the corresponding presence or absence indicative bit of the reference array. A first predetermined correlation weight is assigned to a match of feature presence, a second predetermined correlation weight is assigned to a match of feature absence, and either a third or a fourth predetermined correlation weight is assigned to a mismatch. The correlation weight assigned to a mismatch (i.e., either the third or fourth predetermined correlation weight) has a value that depends upon the status of the consistency bit at the corresponding array position of the vocabulary word reference array.

Further features and advantages of the invention will become more readily apparent from the following detailed description when taken in conjunction with the accompanying drawings.

BRIEF DESCRIPTION OF THE DRAWINGS

FIG. 5 is a flow diagram which, when taken in conjunction with the flow diagrams referred to therein, can be used in programming a general purpose digital computer or microprocessor to implement an embodiment of the invention.

FIG. 10 is a diagram that is useful in understanding the string match memory of FIG. 5.

FIGS. 16A and 16B together show a flow diagram of the service routine of FIG. 5.

FIG. 17 is an exemplary diagram of the pause feature that is useful in understanding the service routine of FIG. 16.

DESCRIPTION OF THE PREFERRED EMBODIMENT

Figure 1:
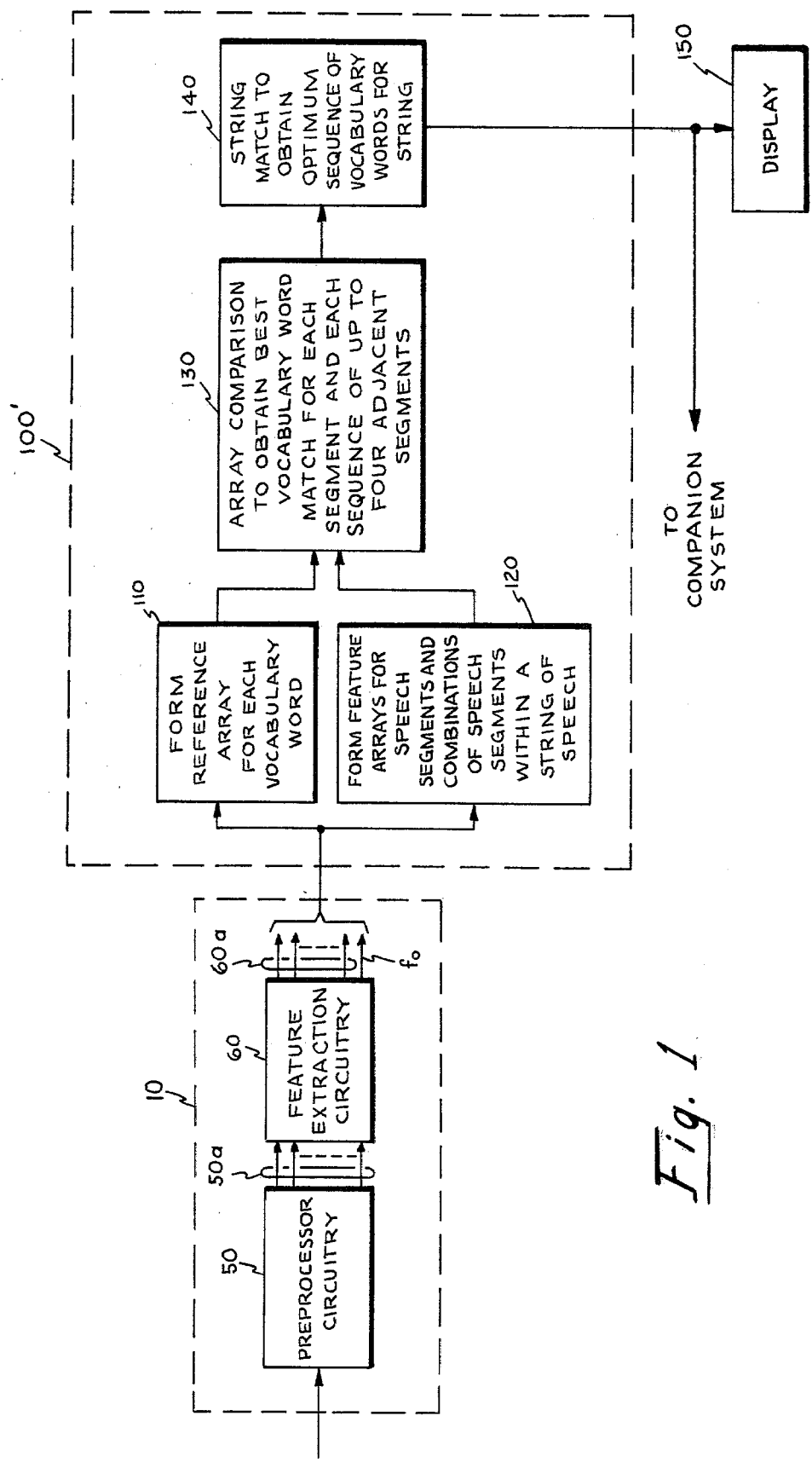
FIG. 1 is a simplified functional block diagram of an apparatus in accordance with an embodiment of the invention.

Referring to FIG. 1, there is shown a simplified functional block diagram of an apparatus in accordance with the invention. Input spoken words are received by a feature extraction means 10 which comprises preprocessor circuitry 50 and feature extraction circuitry 60. (As referred to herein, the terms "input spoken words", "spoken words", "speech", "utterances", or the like are intended to generically include any acoustical or electrical representation of communicative sounds. Typically, the circuitry 50 is adapted to receive word communications directly from an individual, or word representative electrical signals from over a communications link or audio recorder). The preprocessor circuitry 50 utilizes a bank of bandpass filters to translate speech into a plurality of spectral component signals on lines 50a. The signals on line 50a are received by the feature extraction circuitry 60 which generates feature output signals on particular ones of a number of feature output lines 60a, the particular ones depending on the features contained in the speech being received. Signals on the feature output lines may represent, for example, the presence of commonly used vowel or consonant sounds. As will be further described, the circuitry 50 and 60 may be of a type that is known in the prior art.

The feature output lines 60a are coupled to speech processing means 100 (shown within a dashed enclosure) that includes blocks identified by reference numerals 110, 120, 130 and 140. As will be described in detail hereinbelow, the functions of the speech processing means 100 are preferably implemented using a general purpose digital computer, such as the Data General Corp. series Nova 1200. It will be understood, however, that the functions illustrated by these blocks can alternatively be implemented, for example, using a special purpose computer, microprocessor, or hard wired circuitry.

Figure 4:
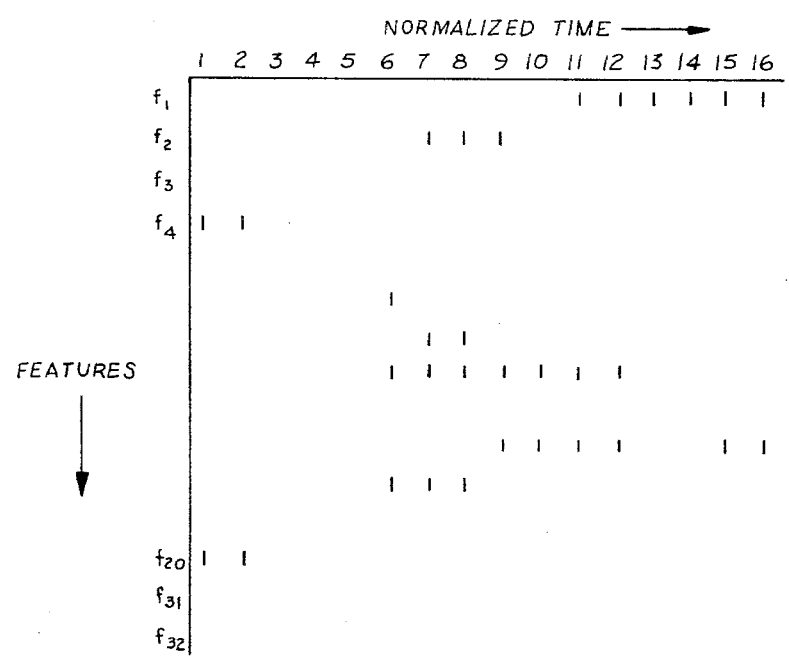
FIG. 4 illustrates a time-normalized array of features of the type utilized in the present embodiment of the invention.

As stated, FIG. 1 is a simplified functional block diagram. The blocks 110–140 are intended to be helpful in gaining an initial generalized understanding of the overall speech processing that is actually implemented in the present embodiment by programming a general purpose digital computer. This is done in accordance with flow diagrams that will be set forth in detail hereinbelow. The block 110 represents the formation of a "reference array" (hereinafter sometimes referred to as an "RAR") for each word to be contained in the "vocabulary" of the system. The reference arrays are formed, in a manner to be described, from the statuses of the feature signals on the feature output lines 60a which occur during "training" utterances of the particular vocabulary word. During a "training" mode of operation, the equipment is "trained" or "loaded" with vocabulary words that are preferably each uttered a number of times by the person who is to later use the machine during a "command" or "operational" mode when strings of one or more spoken words (preferably spoken with short pauses therebetween) are recognized. In the present embodiment of the invention, the stored RARs are time-normalized matrices or arrays of the general type illustrated in FIG. 4, which represent the on/off status of the features 60a during normalized time slots of the training utterances. In accordance with a feature of the present embodiment, and as will be described further hereinbelow, each RAR includes a second bit at each array position (called a "consistency"

bit) that represents the consistency of the feature status at a particular array position during a number of training utterances of the particular vocabulary word. The block 120 represents the formation of a "feature array" (hereinafter sometimes referred to as a "FAR") for each assumed speech segment (i.e., segment of speech-like sounds between pauses) of a string of speech, and also for each of certain combinations of such speech segments. As used herein, the term "string of speech" includes a string of one or more spoken words or sounds bounded by relatively long duration pauses (i.e., the absence of speechlike sounds) at both ends. A typical feature array (FAR) is illustrated in FIG. 4. In the present embodiment the FARs and RARs are seen to both have a time-normalized format. The block 130 represents a comparison of each FAR with each RAR. From the comparisons, there is determined, for each FAR, a particular vocabulary word RAR whose comparison with the FAR yielded the best correlation. For each such "best match", the correlation score obtained is stored, along with a record of which vocabulary word resulted in the best match. This information is then used in a string match procedure, represented by the block 140. In this procedure a sequence of vocabulary words is selected as being the "optimum" sequence of vocabulary words within the string of speech; this being done by determining the sequence of vocabulary words (with repeats allowed) that results in the best overall correlation with the actual string of speech. Signals representative of the vocabulary words are then coupled to a display 150 (so the operator can verify that his spoken words have been correctly recognized) and to a companion system for control thereof. Typically, during the training mode or phase each vocabulary word to be spoken will also be input to the computer (used in implementing speech processing means 100 in the present embodiment) via a keyboard. Then, during the operational mode or phase, when a particular word is recognized, the outputting of the recognized vocabulary word index number (typically a digital signal from 1 to 30, for a thirty-word vocabulary) will cause display of the actual word. Since, in the present invention, a string of one or more sequentially spoken words is recognized, the display will typically output a sequence, such as "592 enter" (spoken as the four words "five nine two enter" with very short pauses between words).

FIG. 2 illustrates prior art feature extraction means which is of a type that is suitable for use as the feature extraction means 10 of FIG. 1. A full description of both the proprocessor circuitry 50 and the feature extraction circuitry 60 can be found in a publication entitled "Acoustic Recognition of A Limited Vocabulary of Continuous Speech" by T. B. Martin and published by University Microfilms, Ann Arbor, Michigan. It should be emphasized, however, that the present invention deals largely with already-processed feature signals and any suitable means for obtaining the feature signals can be employed. Accordingly, the extent of detail set forth herein is limited to that needed to facilitate understanding of the portions of the apparatus thought inventive.

Figure 2A:
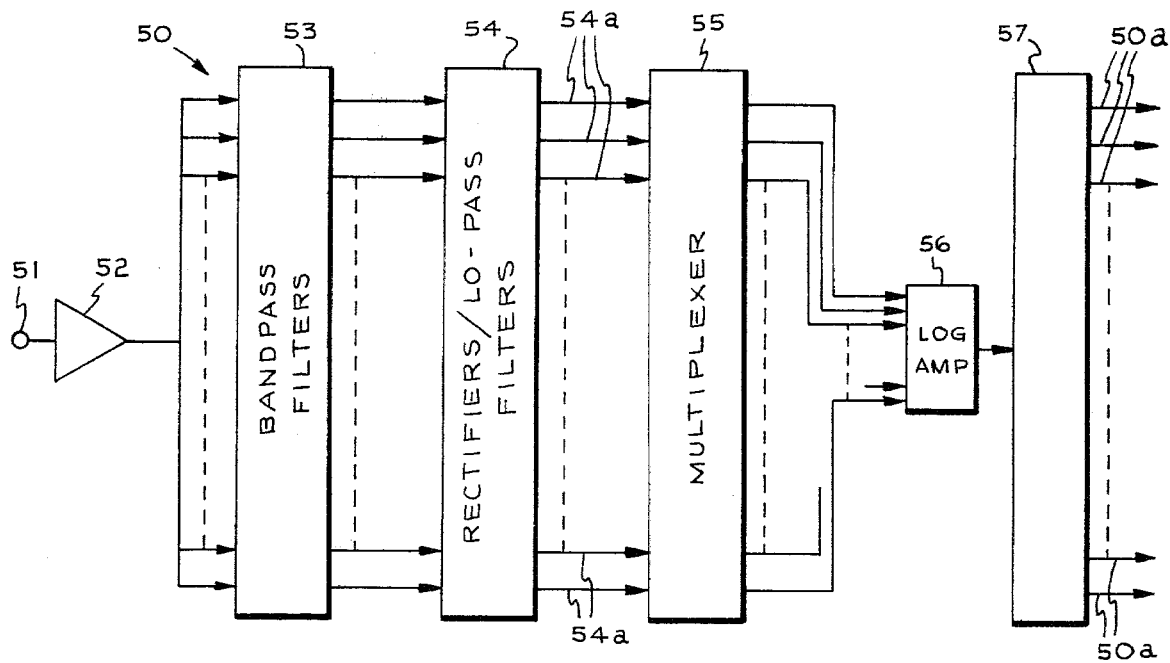
FIGS. 2A and 2B are block diagrams of prior art circuitry useful in the feature extraction portion of the invention.

FIG. 2A is a block diagram of the preprocessor circuitry 50. A transducer 51, typically a gradient microphone, receives input spoken words and produces time-varying electrical signals that are representative of the received sounds. The output of transducer 51 is coupled, via preamplifier 52, to sixteen contiguous bandpass filters in a filter bank 53. Each filter in the bank produces an output signal related to that portion of the input signal which lies in the range of frequencies passed by the particular filter. Typically, the filter center frequencies range from about 250 to about 4500 Hz with the lowest filter bandwidth being about 150 Hz.

The output of each filter in the bank 53 is individually coupled to a full wave rectifier and lowpass filter combination located in a rectifier/lowpass filter bank 54. After rectification and filtering, the outputs of the bank 54 essentially represent the energy levels of the input signal at about the center frequencies of each of the bandpass filters in the bank 53. Viewed in another way, the signals on lines 54a collectively represent the envelope of the energy vs. frequency spectrum of the received input signal taken over the frequency range of interest.

The sixteen channels of information on lines 54a are logarithmically compressed to produce the spectral component outputs on lines 50a of the preprocessor. Logarithmic compression facilitates subsequent processing in two ways. First, it provides dynamic range compression that simplifies the engineering design requirements of feature extraction circuitry 60. Secondly, by virtue of using logarithms, comparative ratios of the spectral component signals can be readily computed by subtraction. Ratios are desirable processing vehicles in that they are independent of changes in overall signal amplitudes. This property is particularly advantageous in a system where input speech of varying loudness is to be recognized.

In the diagram of FIG. 2A, a single log amplifier 56 is time shared to avoid the necessity of using sixteen identical amplifiers to achieve compression. The outputs on 54a are effectively sampled by a multiplexer 55 and the sampled signals passed, one at a time, through the shared amplifier 56. A demultiplexer 57 then "reconstructs" compressed spectral component signals on lines 50a from the processed sampled signals. The sampling clock rate of the multiplexer and demultiplexer is above one KHz and is safely higher than is necessary to retain signal bandwidths. This technique of sharing a single logarithmic amplifier is known in the art and is disclosed, for example, in U.S. Pat. No. 3,588,363 of M. Herscher and T. Martin entitled "Word Recognition System for Voice Controller" as well as in the above-referenced publication of T. Martin.

It will be recalled that the spectral component signals on lines 50a are entered into the feature extraction circuitry 60 (Fig. 1) which senses the presence of properties of the spectral component signals that correspond to preselected properties or "features" of input words. In the prior art feature extraction circuitry being described for illustration, this sensing of properties or "feature extraction" is achieved in part by deriving quantities known as "slope" and "broad slope" characteristics. These quantities give indication as to the polarity and magnitude of the slope of the input envelope when taken over specified segments of frequency spectrum. The manner in which these quantities are obtained is described in the above-referenced publication and patent.

Figure 2B:
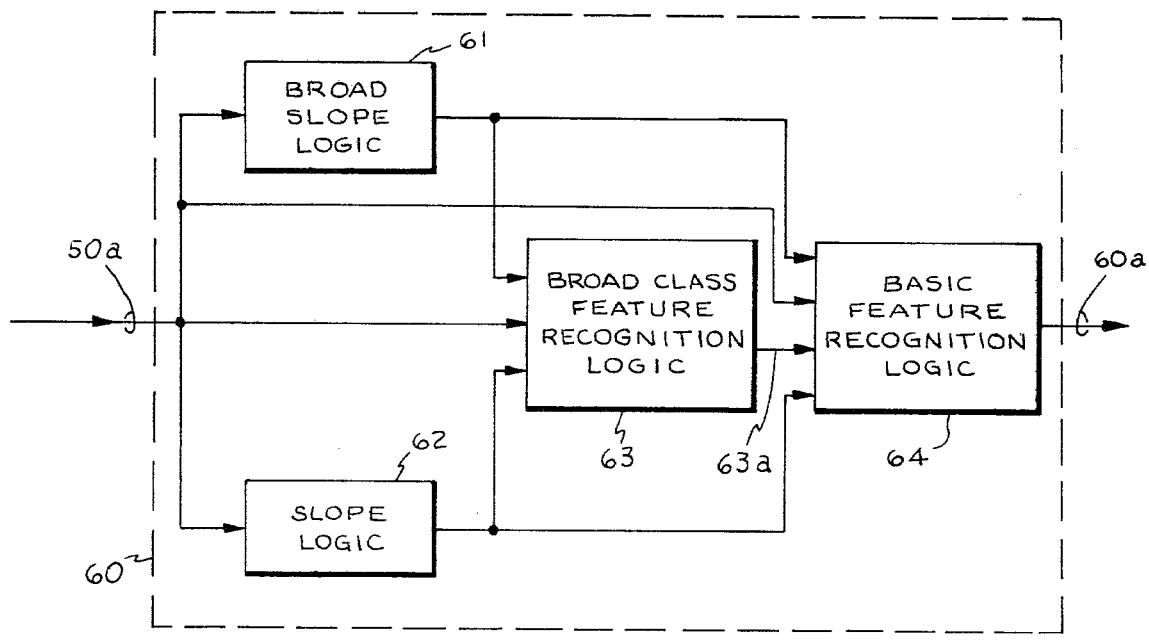

FIG. 2B shows a block diagram of the prior art feature extraction circuitry 60 which receives the spectral component signals on the lines 50a. The circuitry 60, which is also described in the referenced publication and patent, includes logic blocks 61 and 62 which derive sets of slope and broad slope quantities that are received by a "broad clas feature" recognition logic block 63. The block 63 utilizes groups of operational amplifiers and appropriate peripheral circuitry to generate broad class feature signals 63a that indicate the presence of certain broadly classified phonetic characteristics in the input words. Examples of the broad classifications are "vowel/vowel like", "voicing only", "burst", "voiced noise-like consonant", etc. The signals 63a as well as the spectral component signals, slope, and broad slope signals are received by a "basic feature" recognition logic block 64. This block, which includes components that are similar in nature to the block 63, functions to generate the feature signals that indicate the presence of specific phonetic features (e.g. /I/, /s/, /θ/, /ʃ/) of the input spoken words. The block 64 may typically also include an intermediate block that derives "common group features" (e.g. "front vowel", "back vowel", "fricative", "stop consonant", etc.).

Figure 3:
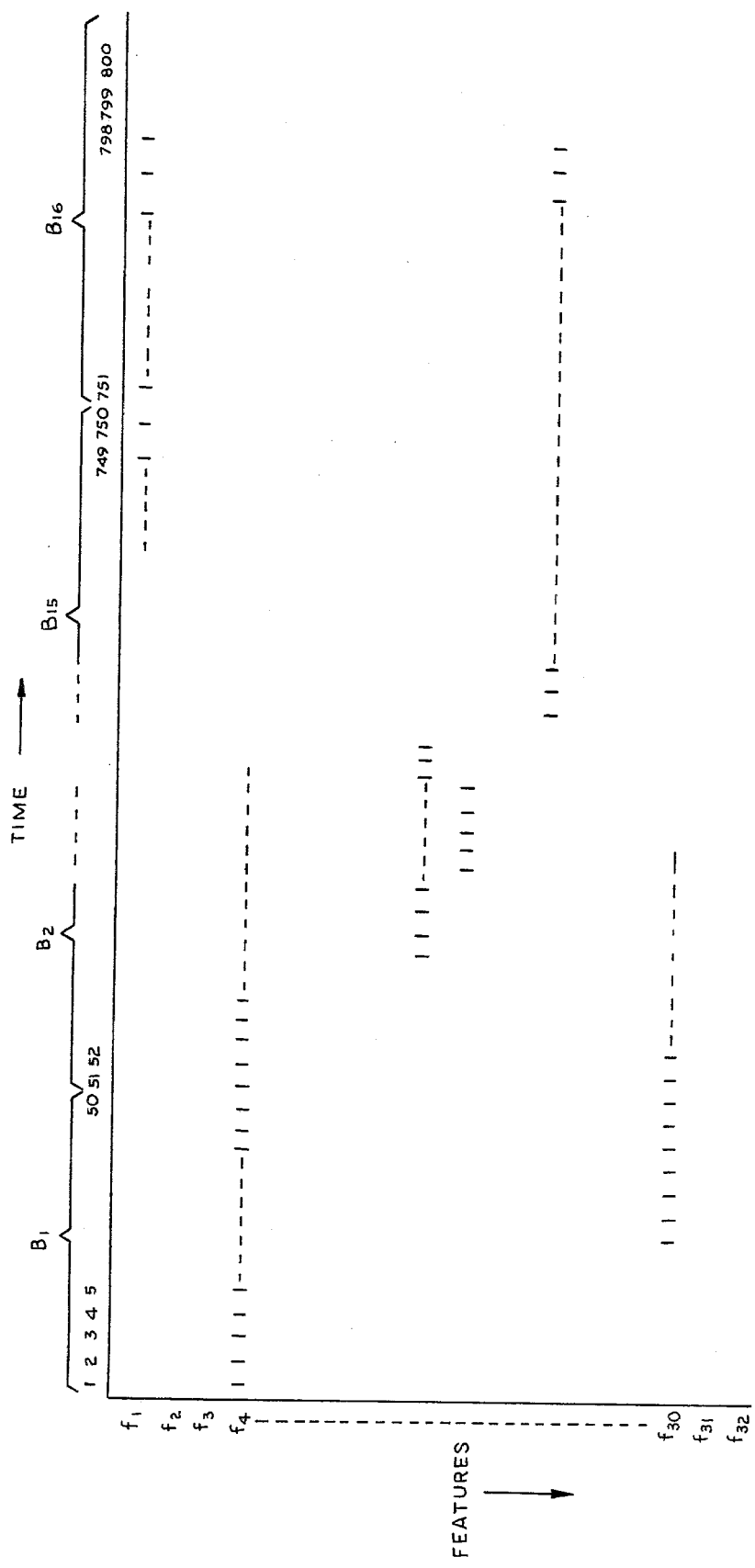
FIG. 3 illustrates an array of features for a given period of time.

FIG. 3 illustrates the type of matrix or array that results from storing the status of the binary features which occur during a particular speech segment or sequence of segments, and from which the reference arrays (RARs) and feature arrays (FARs) of the present invention can be developed, as will be described. In the present embodiment thirty-two binary feature signals, hereinafter sometimes designated $f_1$ through $f_{32}$, are derived on the thirty-two feature output lines 60a and continuously indicate the presence or absence of specific phonemic features. An additional feature, designated $f_o$, indicates the presence (or absence) of speech-like sounds and is referred to herein as the "pause" feature. There are various techniques known in the art for generating a "pause" feature $f_o$. In the present embodiment features are "OR"ed in conjunction with an energy threshold requirement, and sufficient hysteresis is provided to make the pause feature responsive to the absence of energy for about ten milliseconds or more. It will be understood, however, that the invention does not depend on any particular technique of generating a pause feature, so long as it is responsive to relatively short pauses, characteristic of the inter-word pauses in rapidly spoken semi-connected speech. In the example of FIG. 3, it is assumed, for purposes of illustration, that the segment (or sequence of segments) of speech being processed had a time duration of 1.76 seconds. In the present embodiment the feature output signals on lines 60a are sampled every 2.2 milliseconds, so the array of the illustrated example has dimensions of $32 \times 800$. In other words, it records the presence or absence of each of 32 features over 800 "time samples", each time sample being 2.2 milliseconds long. As is seen from the representative 1's of the FIGURE (inserted arbitrarily for illustration), different features occur for varying portions of the word duration with a particular feature usually being "on" continuously for a number of milliseconds. The absence of a 1 at an array position in the FIGURE implies a 0; i.e., the absence of the feature. The time normalization function, to be described below in conjunction with the flow diagrams, reduces each such array to a time-normalized $32 \times 16$ array, the time axis being reduced down to 16 normalized time slots. The normalization can be performed in various ways. In the present embodiment a feature is considered as being present for a time slot of the time normalized array if it is present for more than one-fourth of the corresponding time samples of the array being normalized. The arithmetic process for carrying out this technique is straight-forward, basically involving simple division and counting. To illustrate, in the example of FIG. 3 the 800 time slots for each feature would be divided into groups of 50 each, as shown by the brackets labeled $B_1$ through $B_{16}$. Each bracket contains 50 time samples so, in this example, a particular normalized time slot for a feature will be assigned a 1 if the bracket contains at least 13 1's. For example, in FIG. 3 the feature $f_1$ is shown as having a majority of 1's in the time samples included in bracket $B_{16}$. Therefore, in the normalized array the 16th and last normalized time slot for $f_1$ will contain a 1. An entire $32 \times 16$ normalized array is formed in this manner by examining the count of ones under each of 16 brackets for each of the 31 features. For ease of illustration, in the example given the overall number of time samples is an exact multiple of 16, but if this is not the case, any remainder is distributed among the brackets in a specified manner. For example, if there had been originally 803 time samples, then each of the first three brackets would have included 51 time samples rather than 50, the remainder of the brackets including 50 time samples. FIG. 4 illustrates a typical normalized array, with the 1's again being shown and 0's being implied by the absence of a 1 at an array position.

As noted above, and as will become better understood hereinbelow, the type of time normalized array illustrated in FIG. 4 is formed for both the stored vocabulary words during the training phase (these being the reference arrays of RARs) and for segments and defined sequences of segments of speech during the operational phase (these being the feature arrays of FARs). In accordance with an aspect of the present invention, the reference arrays (RARs) are formed with two bits at each position of each $32 \times 16$ array. One of the bits at each array position represents the presence or absence of a feature during the particular normalized time slot, as illustrated in FIG. 4. The second bit at each array position provides an indication of the consistency with which the particular feature was found to be present or absent during a series of utterances of the particular vocabulary work during the training phase. This "consistency" bit is later used in determining the appropriate correlation weighting when the RARs and the FARs are compared, member-by-member.

FIG. 5 is a general flow diagram which is useful in describing overall operation of the speech processing means 100 and, which when taken in conjunction with the flow diagrams referred to therein, can be used to program a general purpose digital computer or other processor (such as a microprocessor) to implement the invention. FIG. 5 also illustrates portions of the memory (preferably random access memory) associated with the processor, so as to facilitate understanding of operation and further illustrate the nature of information stored and then used during various portions of the overall routine. Memory is shown in dashed line.

Figure 16B:
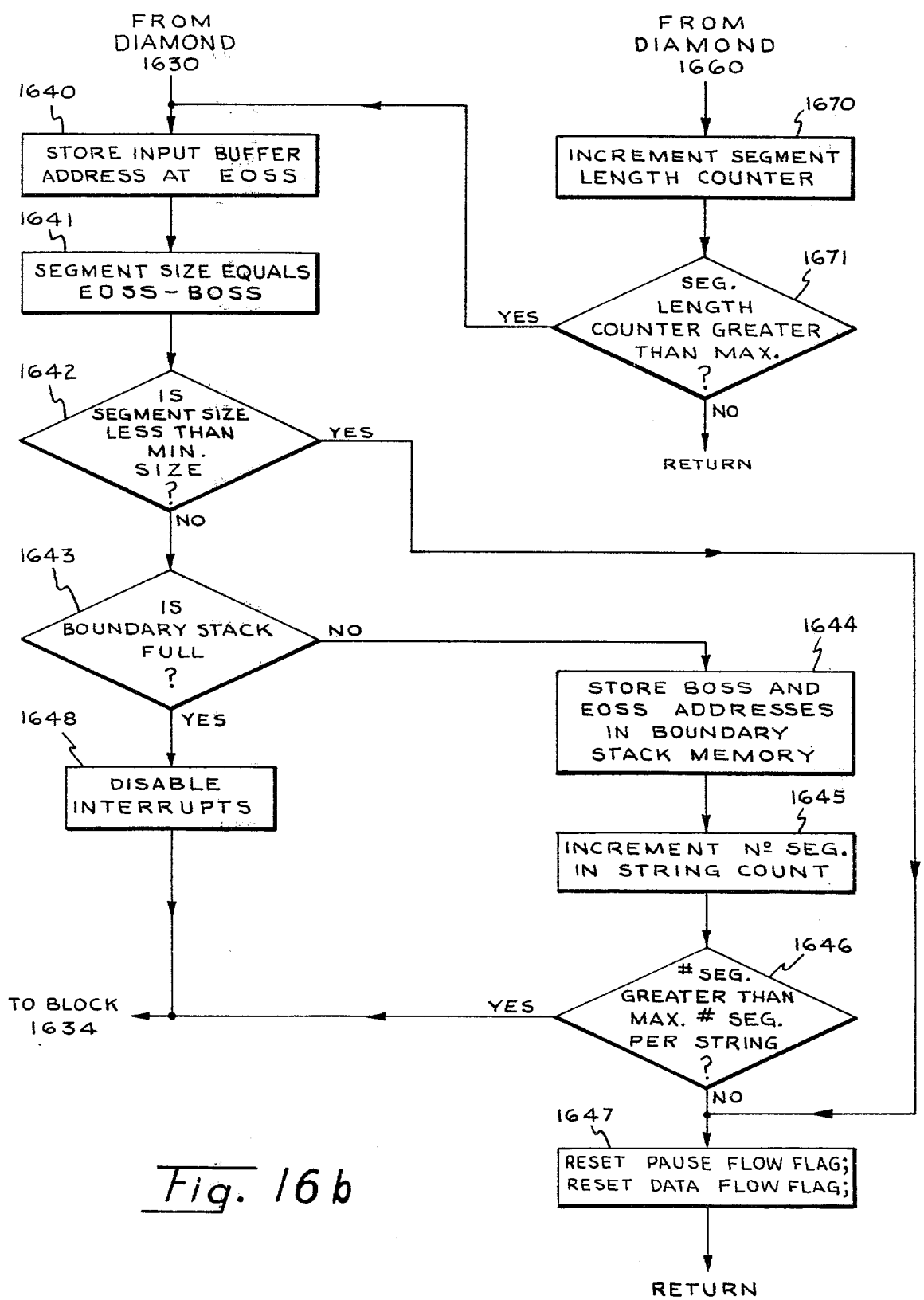

The block 510 represents a routine caled a "service" routine. This routine, which is set forth in further detail in conjunction with the flow diagram of FIG. 16, is operative, inter alia, to cause the storage of the feature signals 60a in an input buffer memory 511 which, in the present embodiment, holds 1000 32-bit samples. The 32 feature lines are sampled every 2.2 milliseconds (the "interrupt" rate) as is conventionally derived from a clock (not shown). Accordingly, the 1000 samples of feature signals stored in input buffer memory 511 represent the latest 2.2 seconds of received sounds. The buffer 511 can be visualized as having 1000 address locations with a 32-bit feature signal sample being stored at each address location. (Typically, each 32-bit feature sample will require two standard 16-bit computer words but, for ease of illustration, each sample will be considered as being stored at a particular address. Similarly, in the description below, when information such as a number of bits or an array of bits is indicated as being stored at a given address location, it will be understood that this may actually involve a group of addresses, depending upon the size of a word in the particular computer being used and upon the size of the information to be stored at the "address" stated to hold the information.) The buffer 511 is operated in a "recirculating" fashion in that the samples loaded therein are dumped into successive addresses until the highest address is reached, whereupon the next sample is loaded into the lowest address. As stated, this results in the buffer always holding the latest 1000 feature signal samples. The service routine is also operative to store, in a portion of memory designated as the "boundary stack memory" 512, the addresses of particular feature signal samples stored in buffer 511 that constitute potential boundaries between speech segments and between strings of speech segments.

In particular, the boundary stack memory 512 is a first-in-first-out ("fifo") stack that is loaded with the addresses of boundaries that divide speech sounds from non-speech (noise or silence). These boundaries are defined in the present embodiment by transitions of the "pause" feature, $f_o$. If a pause does not persist for at least a prescribed minimum time (132 milliseconds, or 60 sample periods, in the present embodiment), it is considered a "short pause" that divides speech segments within a string (i.e., either an intra-word boundary between different parts of a single word or an intra-word boundary between different words). If a pause is found to persist for more than the prescribed minimum time, it is considered a "long pause" which defines a boundary at the beginning and end of a string of speech. As noted above, a string of speech may include one or more sequentially spoken words. In the present embodiment, the maximum number of words in a string is twelve.

Figures 6, 7A:
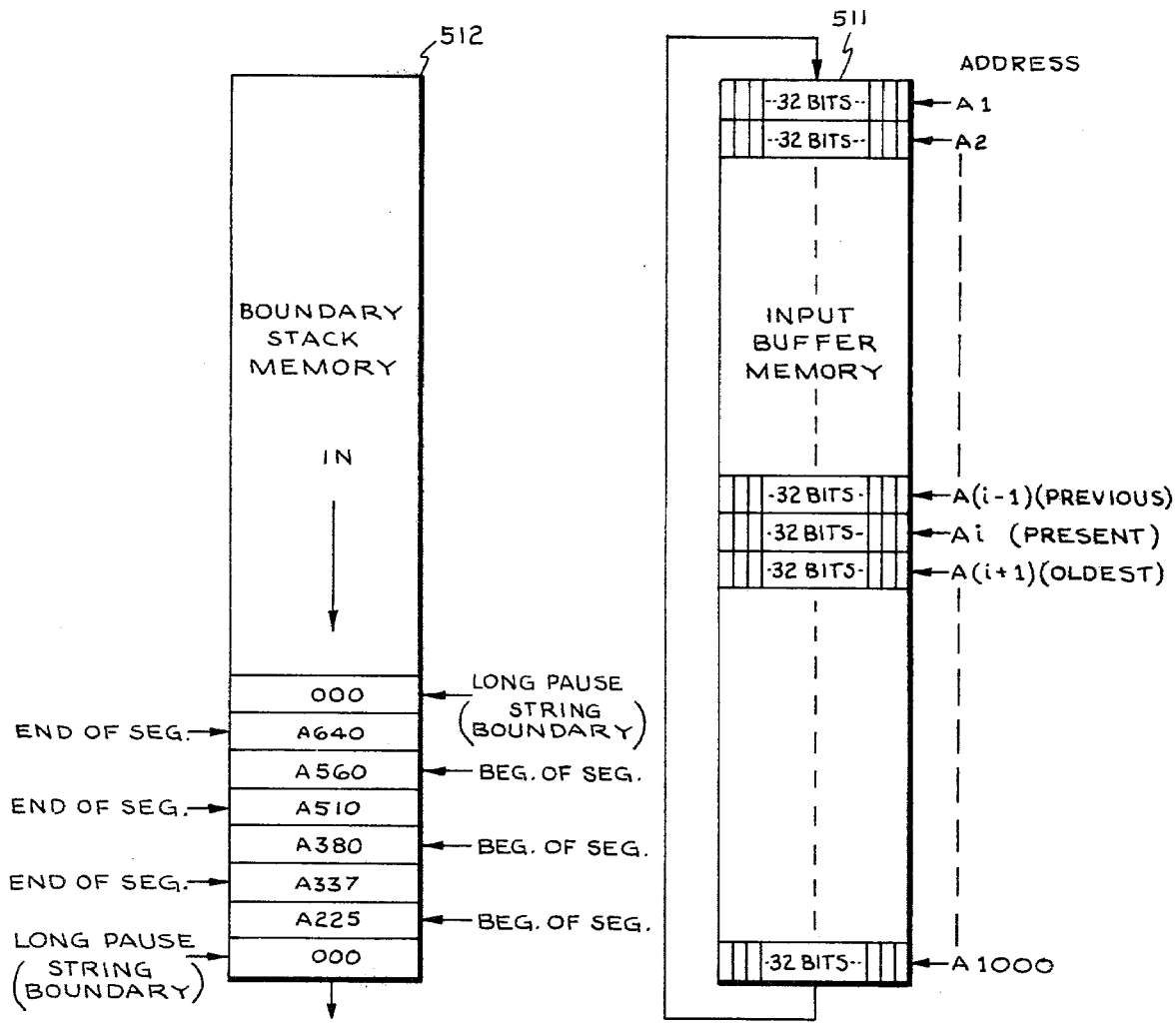
FIG. 6 is a diagram that is useful in understanding the input buffer memory of FIG. 5.
FIG. 7A is a diagram that is useful in understanding the boundary stack memory of FIG. 5.
Figure 7B:
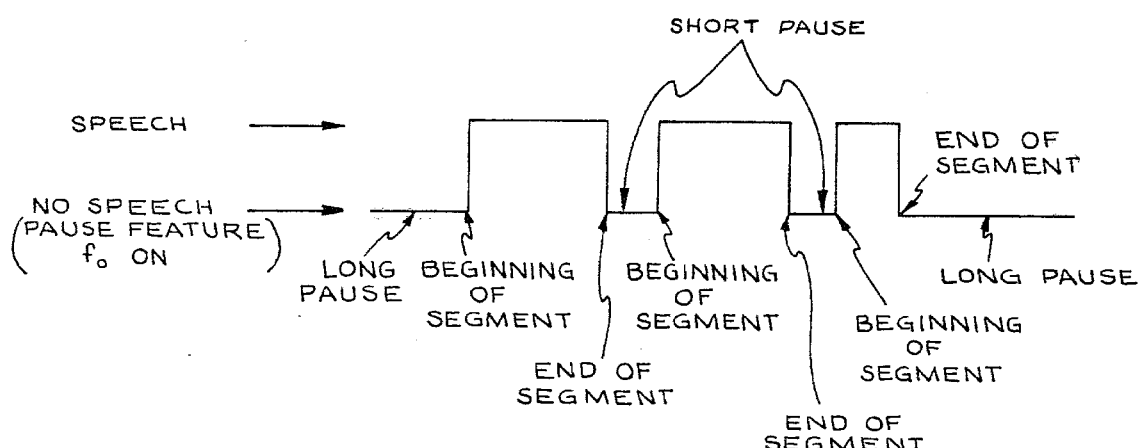
FIG. 7B illustrates an example which is useful in gaining further understanding of the diagram of FIG. 7A.

FIGS. 6 and 7A respectively illustrate the input buffer memory 511 and the boundary stack memory 512 of FIG. 5. The input buffer includes 1000 32-bit words located at addresses designated A1 through A1000. At each address position is a 32-bit word representative of the 32 features sampled during a particular 2.2 millisecond sampling interval. In FIG. 6, the latest sample is represented as being at address Ai, in which case a previous sample would be stored at address A(i−1), and the oldest feature sample in storage (2.2 seconds old in this embodiment) is stored at address A(i+1). It is seen that in this type of recirculating arrangement, the latest sample is always written over the oldest sample. FIG. 7A illustrates an example wherein the boundary stack memory 512 holds boundary address designations representative of three speech segments between long pauses, where long pauses are indicated in the boundary stack memory by all-zeros ("000"). In the example of FIG. 7, each of the three speech segments is identified by its "beginning of segment" address and its "end of segment" address. FIG. 7B is a diagram of the pause feature, $f_o$, which would result in the type of boundary stack entries illustrated in FIG. 7A.

In FIG. 5, the contents of the boundary stack memory 512 and the input buffer memory 511 are used during a routine designated as the "reduce" routine 520 to form time-normalized arrays representative of individual speech segments and sequences of adjacent speech segments. As previously noted, these time normalized arrays are called "feature arrays" (FARs) and are stored in a portion of memory called a "FAR stack memory" 521. Another memory, designated a "recognition stack memory" 522, is used to keep track of addresses of the FARs in the FAR stack memory 521, as well as to keep track of the end points of strings of speech segments, this being done with all-zeros ("000") designations, as was the case for the boundary stack memory 512. A routine 550, designated as the "training routine" is used during the training phase of operation to store a time-normalized array for each vocabulary word. As previously noted, these are called "reference arrays" (RARs) and are stored in a portion of memory called a "RAR memory" 551.

Figure 8A:
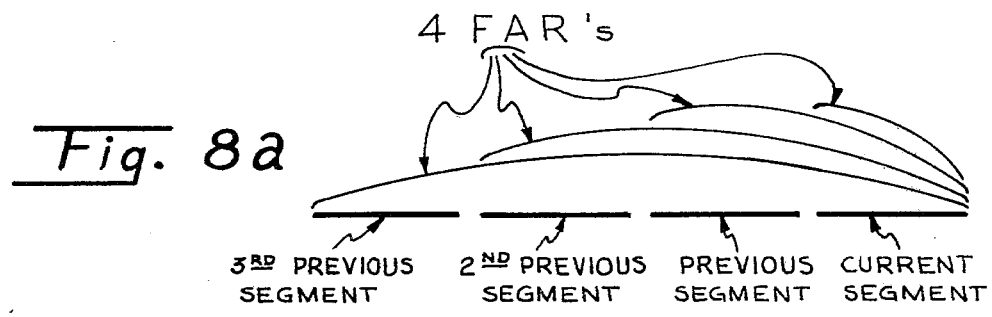
FIGS. 8A through 8D illustrate sequences of up to four speech segments and the manner in which feature arrays (FARs) are formed therefor.
Figure 8B:
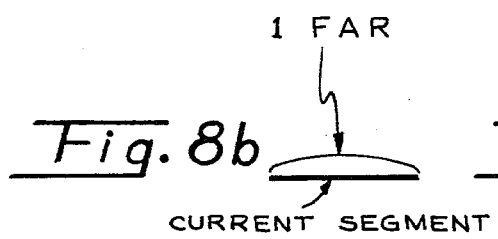
Figure 8C:
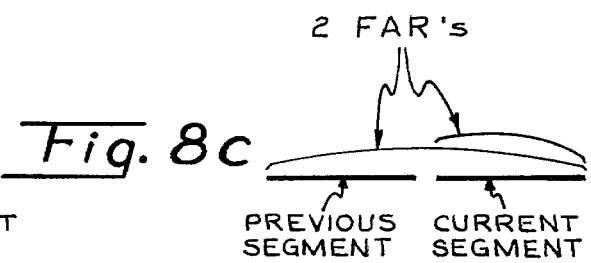
Figure 8D:
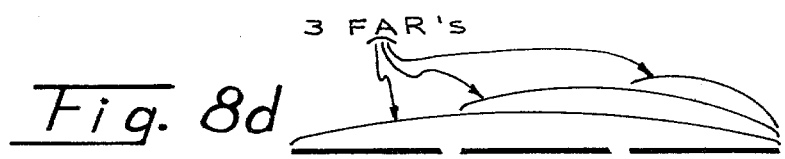

Each speech segment processed by the "reduce" routine 520 of FIG. 5 results in four time-normalized feature arrays (of the type illustrated in FIG. 4) being stored in the FAR stack 521. This is because each speech segment processed during this routine is considered as being each of the following: the only speech segment of a one-segment word; the last speech segment of a two-segment word; the last speech segment of a three-segment word; and the last speech segment of a four-segment word. FIG. 8A illustrates these four possibilities. (Of course, this procedure results in each individual speech segment at some time also being considered as other than the last segment of a multiple segment word. For example, it will be understood that in FIG. 8A, the segment currently being processed will be considered as the next-to-last segment of a word when the next speech segment is processed by the reduce routine 520.) It will be understood that for the first three segments of a string, some of the four listed possibilities do not exist. For example, the first segment of a string could only be (among the four listed possibilities) the only segment of a one-segment word (see FIG. 8B). Similarly, the second segment of a string could only be (among the four listed possibilities) either the only segment of a one-segment word or the last segment of a two-segment word (see FIG. 8C). Finally, the third segment of a string could only be (among the four listed possibilities) either the only segment of a one-segment word, the last segment of a two-segment word, or the last segment of a three-segment word (see FIG. 8D). Accordingly, it will be understood that the first, second, and third segments of a string respectively have only one, two, and three FARs calculated therefor during the reduce routine 520. The fourth and subsequent segments of a string, there will be four FARs formed for each segment.

Figure 9:
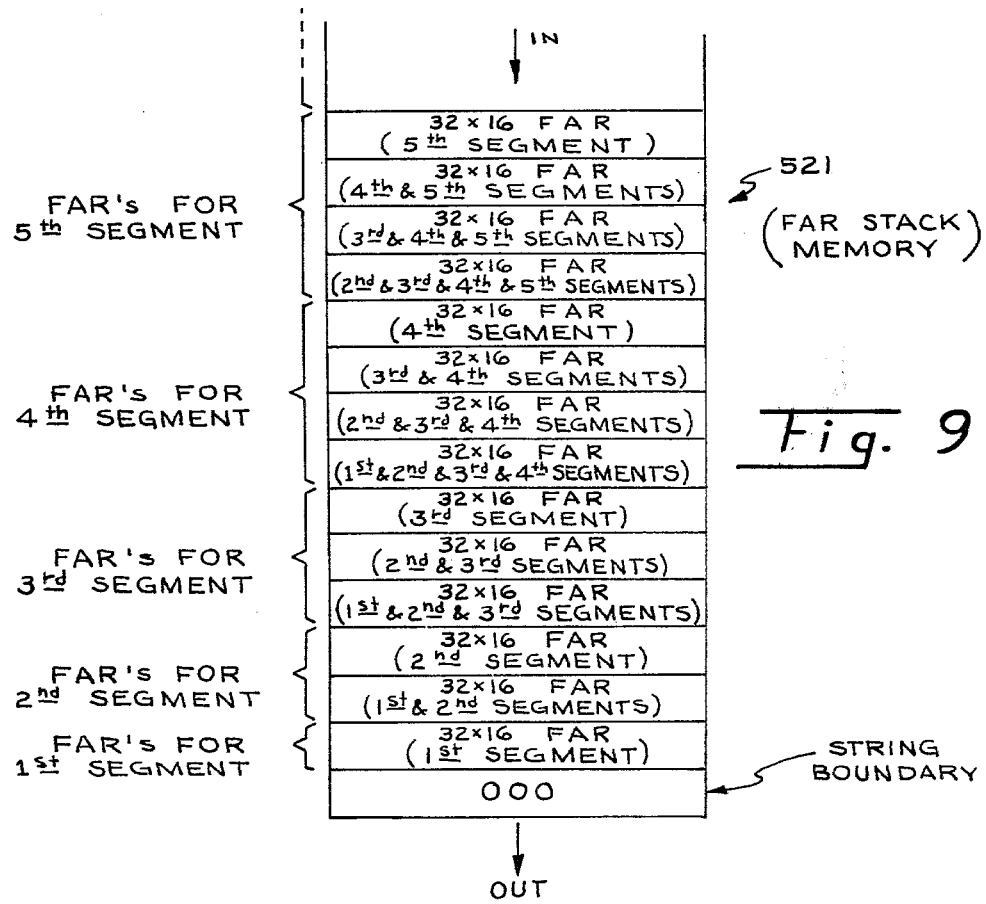
FIG. 9 is a diagram that is useful in understanding the FAR stack memory of FIG. 5.

The manner in which the FAR arrays are stored in the FAR stack memory 521 (a first-in-first-out stack) is illustrated in FIG. 9. After a string boundary, the FARs are stored in the manner previously described, there being one FAR associated with the first segment of the string, two FARs associated with the second segment of the string, three FARs associated with the third segment of the string, and four FARs associated with the fourth and each of the subsequent speech segments of a string. In the example of FIG. 9, there are five segments in a string shown as being stored in the FAR stack memory 521.

The next routine of FIG. 5 to be described is the "recognize" routine, represented by block 530. During the "recognize" routine 530, each of the FARs in the FAR stack is correlated against each vocabulary word reference array (RAR). Stated another way, each possible single word configuration (of up to four segments per word, in the present embodiment) within the string is compared against each of the vocabulary words (thirty in the present embodiment) that were stored as time-normalized reference arrays (RARs) during the training phase of operation. For each such comparison, two results are stored: one result being a record of the particular vocabulary word that yields the best correlation (or "best match"), and the other being the actual correlation score for said best match. This information is stored in a portion of memory designated as the string match memory 531. These two determinations are stored in the string match memory as arrays called "HWRD" and "HCOR", respectively. The form of these arrays is illustrated in FIG. 10. Since there are a maximum of twelve word segments in a string (in the present embodiment), and there are four FARs for each segment, the arrays HWRD and HCOR will each have a maximum of forty-eight members. As seen in FIG. 10, these members are designated as HWRD(0) through HWRD(47) and HCOR(0) through HCOR(47). As noted above, because of their positions in the strings, the first three segments of a string actually have less than four RARs each, so the non-existent possibilities are indicated by dashes in the arrays of FIG. 10. Thus, in FIG. 10, the array member HWRD(3) will be a number between 1 and 30 (for a thirty word vocabulary) representative of the particular vocabulary word which yielded the best correlation score when compared against the FAR for the first segment of the string. The number stored at HCOR(3) is that best correlation score. Similarly, the number stored at HWRD(6) will be the number representative of the particular vocabulary word which yielded the best correlation score when compared to the FAR for a word consisting of the combination of the first and second segments of the string; and the number stored in HCOR(6) will be that best correlation score. Further, the number stored at HWRD(7) will be the number representative of the particular vocabulary word which yielded the best correlation score when compared to the FAR for a word consisting of the second segment (only); and the number stored at HCOR(7) is that best correlation score. As a further example, stored at array position HWRD(12) will be the number of the vocabulary word which yielded the best correlation score when compared to the FAR for a word consisting of the combination the first, second, third and fourth segments of the string; and the number stored at HCOR(12) will be that best correlation score. As a final example, the number stored at HWRD(16) will be the number representative of the particular vocabulary word which yielded the best correlation score when compared to the FAR for a word consisting of the second, third, fourth, and fifth speech segments of the string; and the number stored at HCOR(16) will be that best correlation score.

In the illustration of FIG. 10, it is seen that for a string of twelve speech segments (the maximum allowable string between "long pauses" allowed in the present embodiment) there are forty-eight "HWRD" and forty-eight "HCOR" numbers stored; i.e., four for each of the twelve speech segments of a maximum length string. If less than twelve speech segments are found to be present in a given string, these arrays will be shorter and, in fact, will each have a number of members that is equal to four times the number of speech segments in the particular string. As will be described further hereinbelow, the correlation scores stored in the HCOR array will be "weighted" before they are used. The weightings reflect the number of segments included in each assumed "word" and are used to equalize comparisons between different segment/word combinations within a string.

Figure 11:
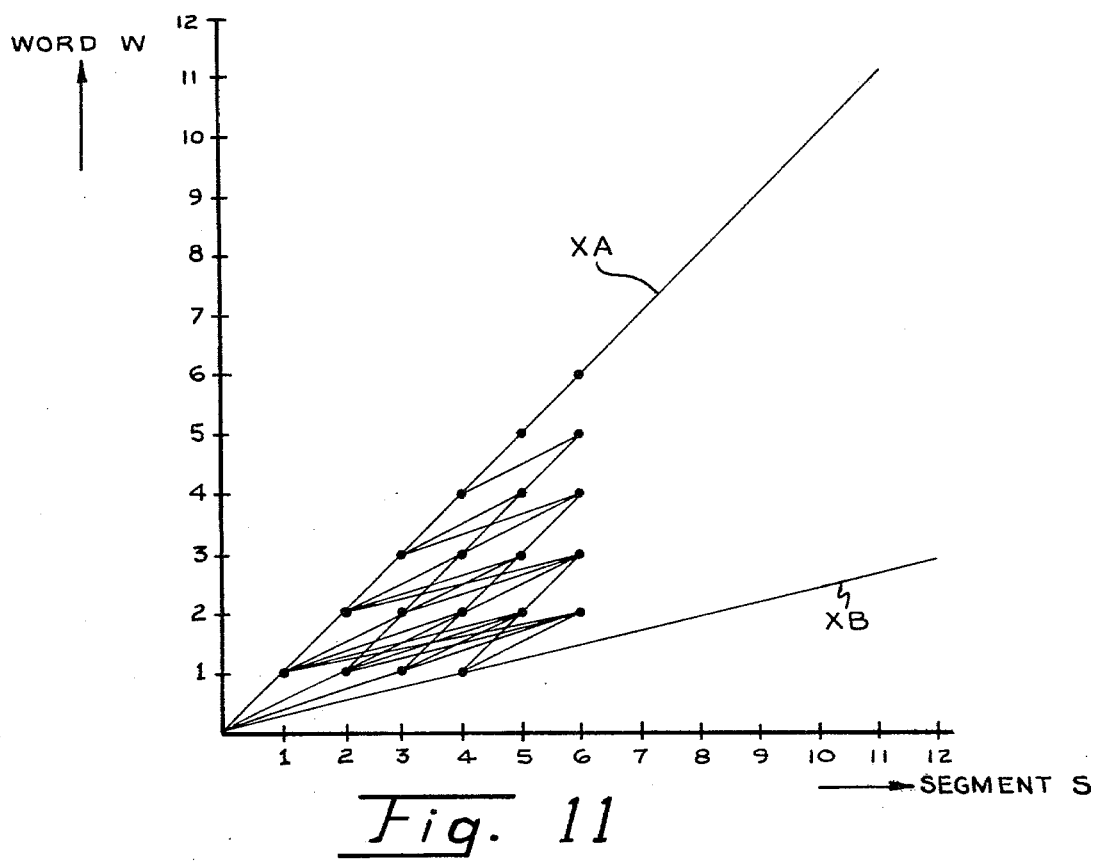
FIG. 11 illustrates the format of a segment versus word plot for a string of speech segments, and shows string configurations for up to six segments.
Figure 12:
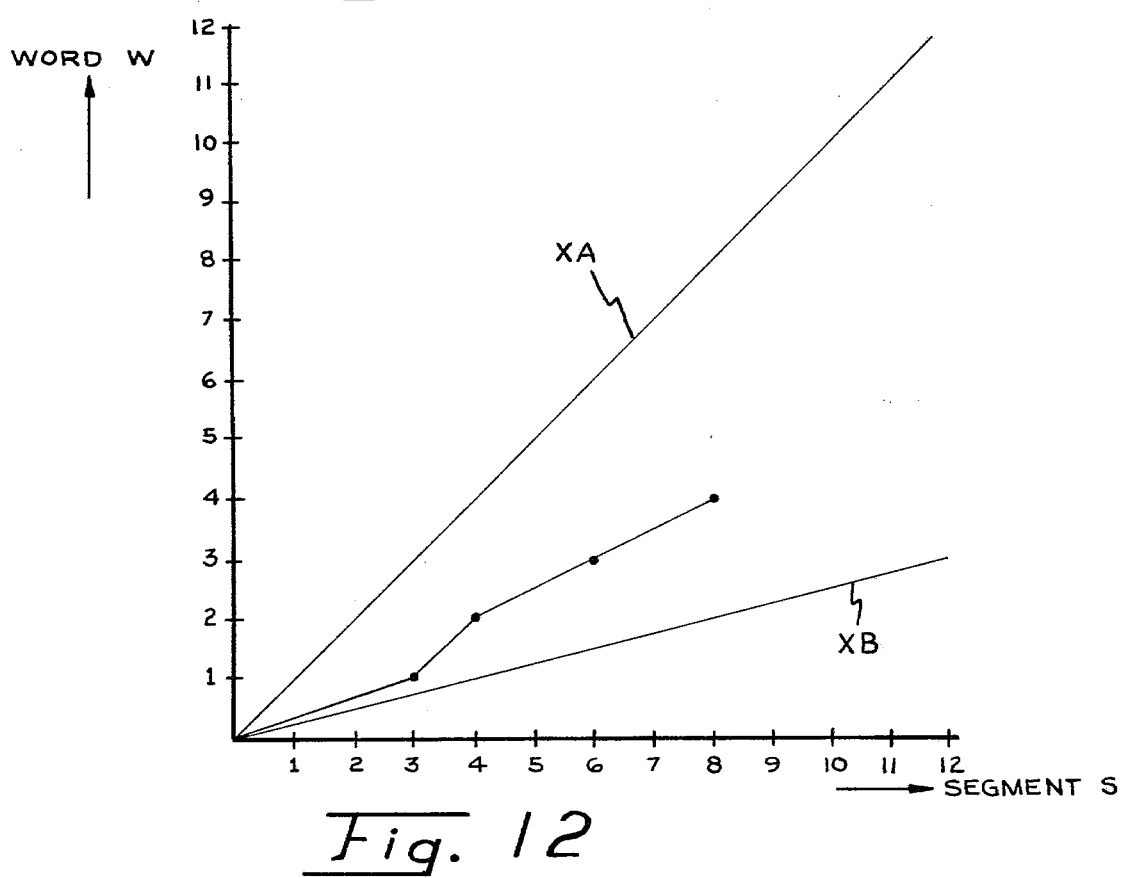
FIG. 12 is a segment versus word plot which illustrates an example of a particular string of segments.

The arrays HWRD and HCOR stored in the string match memory 531 are used during the string match routine, represented by the block 540 of FIG. 5. Before proceeding with description of how the "HWRD" and "HCOR" arrays are used in this routine, reference can be made to FIG. 11 to gain some understanding of the string matching technique used in the present embodiment. FIG. 11 illustrates a 12-by-12 plot of speech segment S versus word W. This graph can be used to represent all possible strings of from one to twelve speech segments, with a minimum of one speech segment per word and a maximum of four speech segments per word (as are the prescribed conditions for the present embodiment). The line XA represents a string of the maximum number of words for a twelve segment string; i.e., one segment per word, or twelve words. The line XB represents a string of the minimum number of words for a twelve speech segment string (for the present embodiment); i.e., four speech segments per word, or three words. (In the plot of FIG. 12, only the paths for up to six segments are shown, for ease of illustration.) For a given string of speech segments (for example, a maximum length string of twelve speech segments) there are typically a large number of possible strings of words having various numbers of speech segments per word. A representation of a particular sequence of word lengths (i.e., number of segments per word) for a string of segments can be represented on the graph of FIG. 11 by traversing from the origin (0,0) (i.e., the beginning of the first segment) to the final point of the string (i.e., the end of the last speech segment of a string). For example, in the plot of FIG. 12 (which is of the same segment vs. word format as FIG. 11) the curve illustrates a string of eight speech segments made up of four words. In this example the first word includes three speech segments and is represented by a traversal between the origin and the point (3,1). The second word in the example of FIG. 12 is one speech segment long, and is represented by the traversal to the next point (4,2), and the next two words are each two speech segments long, and are represented by the successive traversals to the points (6,3) and (8,4). As previously stated, the traversals must be within the stated rules (for this embodiment) of from one to four speech segments per word, as indicated by the boundary lines XA and XB shown again in FIG. 12.

Figures 13, 14:
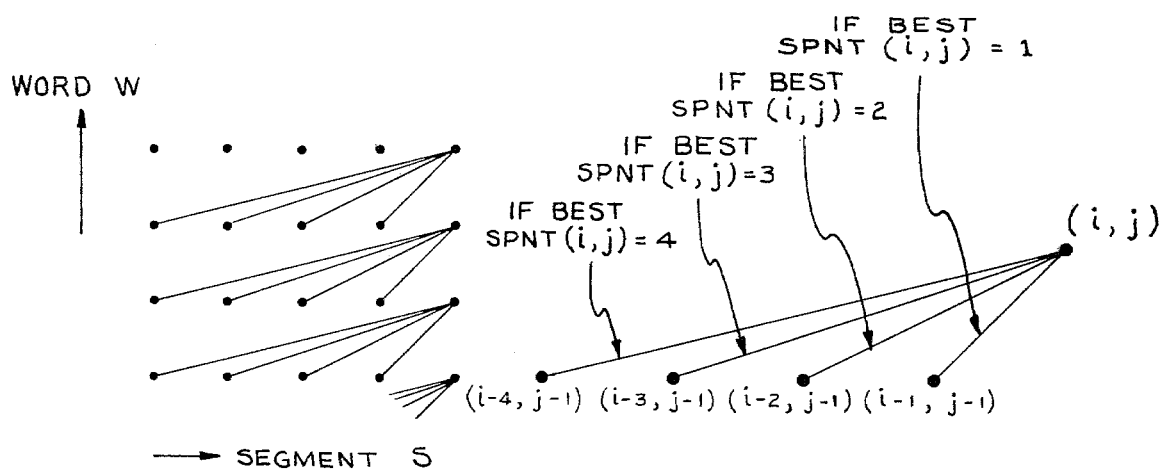
FIG. 13 is a portion of a segment versus word plot that is useful in understanding the string match routine.
FIG. 14 is a diagram that is useful in understanding the SPNT array used in the string match routine.

It will be understood that for speech segment strings of significant length there will be many possible combinations of word lengths within a string. If computing time and expense were not a factor, one could consider all possible sequences of word length combinations for a given string of speech segments, and by correlating each word of each possible sequence with all vocabulary words, one could then proceed to find the optimum sequence of vocabulary words (i.e., the one which resulted in the best overall correlation) for the particular string of speech segments. In accordance with the present embodiment, however, a dynamic programming technique of string matching is used to reduce the necessary number of computations in finding an optimum sequence of words within a string. The procedure is set forth in detail later in the specification in conjunction with the string match flow diagrams. In broad terms, however, the string matching procedure is as follows: As a current speech segment is being considered, all paths (i.e., traversals from point-to-point as in FIG. 11 or 12) which include that segment, are considered in determining which path results in the best overall correlation up to the current segment. For example, consider the diagram of FIG. 13, which represents a portion of a segment vs. word plot of the type shown in FIG. 11 or 12. The points in each column represent a given segment number in the string, and the points in each row represent a given word number in the string. For each of the points in the right-most column it has been explained that there are four possible traversal paths, each coming from one row below the point in question. (In other words, and as previously noted, the current segment must be one of the following: the only speech segment of a one-segment word; the last speech segment of a two-segment word; the last speech segment of a three-segment word; or the last speech segment of a four-segment word. As also previously noted, the current segment need not necessarily be the last segment of a word, but this is taken into account when subsequent columns are processed, as will become clear.) Thus, in the diagram of FIG. 13, it is necessary to determine the best path to each of the points in the right-most column, the best path being defined as the path which results in the highest overall correlation score up to the point in question. In order to determine the highest overall correlation score to each point of the right-most column in FIG. 13, one needs to know the best overall score to each of the points in the preceding three columns of points. To each of the scores of these preceding column points is added the correlation score representative of the path from the particular preceding point to the new (right-most) point, the latter being available in the HCOR array. In the dynamic programming procedure used in the present embodiment, the best overall scores to each of these prior points is stored (as will be described momentarily) and a record is also stored of the particular overall path to each point which yielded such best score. The path is represented by a pointer array designated SPNT(S,W). In particular, at each point of the array, there is stored a number 1,2,3 or 4 which indicates the path back to a previous point from which said best overall path was found to exist. For example, for the point (i,j) in FIG. 14, if the best overall path was found to be from point (i-1,j-1) the pointer array SPNT (i,j) would be set equal to 1. If the best overall path was found to be from point (i-2,j-1), SPNT (i,j) would be set equal to 2. If the best overall path was found to be from point (i-3,j-1), SPNT (i,j) would be set equal to 3. Finally, if the best overall path was found to be from point (i-4,j-1), SPNT (i,j) would be set equal to 4. As will be further described hereinbelow, the array SPNT can subsequently be used to trace back from the end of a string of speech segments to the beginning thereof in order to backtrack via the best overall path. As this is done, the individual words which make up the string are identified (i.e., they are retrieved from the HWRD array) and read out, typically for display and/or control of a companion system (see FIG. 1).

Figure 15:
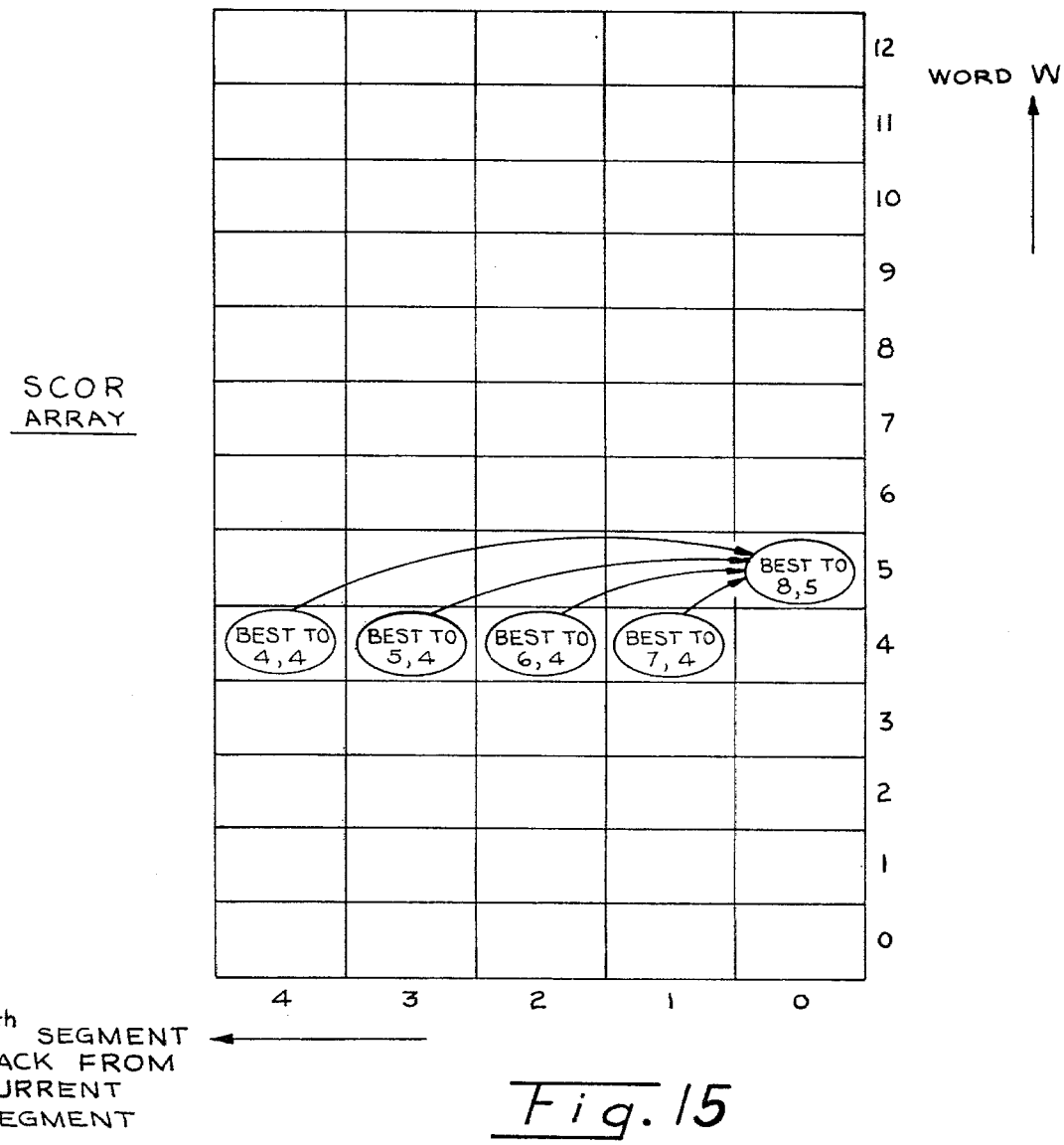
FIG. 15 is a diagram that is useful in understanding the SCOR array used in generating and memorizing correlation scores for different paths in the string match routine.

From the foregoing, it will be recognized that as the various optimum overall paths to each column of points are determined, it is necessary only to "save" the information concerning the optimum overall paths to the points of the previous four columns. In the present embodiment, an array designated as "SCOR (L,W)" is used to keep track of this information. The format of the SCOR array is illustrated in FIG. 15. The rows, W, represent word number within the string, and L represents a number of segments (0,1,2,3 or 4) back from the current segment. The L=0 column of the SCOR array represents the right-most (current) segment for which new optimum scores are being computed (corresponding to the rightward moving "front" column in the segment vs. word plot of FIG.s 11 or 13). The four columns designated L=1 through L=4 hold the best correlation scores to the points of the previous four columns (of the segment vs. word plot), as are needed for computing the current optimum scores, which go in the L=0 column. (Again, and as will be detailed in conjunction with the flow diagram of the string match routine, the current scores are obtained by adding appropriate individual path scores stored in HCOR to the previous best overall scores.) Accordingly, the SCOR array can be visualized as holding the best scores up to a current segment, S, being processed, the SCOR array having the same layout and positions as the points illustrated in FIG. 13. After each new column of scores is computed and placed in the L=0 column of the SCOR array, the information in the SCOR array is shifted to the left by one position, and the next column of points of the segment vs. word plot (i.e., the next speech segment of the string) is processed. Thus, the SCOR array can be viewed as a processing "front" which is moved along from left to right as superimposed over the segment vs. word plot of the string, with the speech segments of a string being sequentially processed in order. As an example, the circled scores shown in the SCOR array of FIG. 15 show what the entries would be at illustrated positions of the SCOR array when processing the segment S=8, with W=5.

It was noted above that as the individual path which yields the best overall correlation to each point is found, an entry is made in the pointer array "SPNT" to keep a record of the best overall path to each point. After the last speech segment of a given string has been processed, a determination is initially made from among the final column of points (of the segment vs. word plot) as to which point yields the best overall string correlation score. (Actually, since the vertical variable within a column of the segment vs. word plot represents "word number", this initial determination is of how many words there are in the optimum string path.) The pointer array, SPNT, is then used to trace back through the segment vs. word plot in accordance with the best path back through the string of speech segments. During this tracing back, the array "HWRD" is used to identify which word resulted in the optimum correlation at each word position, and the array "HCOR" is used to recall the correlation score for such word (so that a determination can be made as to whether or not a predetermined threshold correlation has been passed for each word of the string). This procedure is continued as tracing back through the string of speech segments continues to the "origin" of the segment vs. word plot.

Explanation of the flow diagrams begins with a description of FIG. 16 which is a flow diagram of the service routine represented by block 510 of FIG. 5. (An "initialize" block, wherein pointers, counters, flags, etc., to be used are set to their initial states, is part of another routine in the main program flow, as will be described.) As noted above, the service routine is entered every 2.2 milliseconds and a new sample (of 32 features, in the present embodiment) is entered in the input buffer memory 511. Also the service routine is used to identify the beginnings and ends of speech segments and the boundaries between strings (i.e., long pauses) for loading into the boundary stack memory 512, as described above. To facilitate understanding of how this is done using the service routine, reference is made from time to time to the simplified diagram of FIG. 17 which illustrates an example of how different portions of received sounds are identified for purposes of defining the segment and string boundaries used herein.

In FIG. 17, the "pause" feature, $f_o$, is shown, as a function of time, as being either "on" or "off". In the example illustrated, a long pause is shown as occurring first. It will be recalled that a long pause is defined as a pause which persists for a least 132 milliseconds. In FIG. 17, a continuing pause is labelled by a one in a circle. After the pause, the onset of speech-like sounds is labelled with a two in a circle. The continuance of speech is labelled by a three in a circle. The end of speech (i.e., the onset of a pause) is labelled by a four in a circle.

In the flow diagram of FIG. 16, diamond 1611 is entered (upon occurrence of an interrupt) and inquiry is made as to whether or not the next input buffer address is above the highest memory address allocated to the input buffer. If so, the address is reset to the lowest memory address allocated to the input buffer (block 1612), the input buffer memory thereby having a "wraparound" nature, as described above. Diamond 1613 is then entered (and is also entered from the "no" output branch of diamond 1611), and inquiry is made as to whether an input buffer "overflow" condition exists. In the present embodiment, an input buffer overflow condition is defined as occurring when the oldest feature sample in the input buffer memory has not yet been reached for processing when it is time to write over the address holding said oldest feature sample. This is readily determined by comparing the current input buffer address to the oldest address being processed (in a later routine, as will be described). If an overflow condition is evident, the interrupts are temporarily disabled (block 1616) and block 1634 (below) is entered. In this manner, the feature samples already in the buffer continue to be processed until such time as the input buffer overflow condition is alleviated. In normal operation, where there is no input buffer overflow, block 1614 is entered, this block representing the storage of the next sample of 32 features (on lines 60a) at the specified address location of the input buffer memory. The input buffer memory address is then incremented, as represented by block 1615. Diamond 1620 is then entered and inquiry is made as to whether or not the "pause" feature is on. If so, a condition is indicated which corresponds either to that of reference numeral 1 in a circle of FIG. 17 (i.e., pause was on during the previous sample) or reference numeral 4 in a circle of FIG. 17 (i.e., pause was off during the previous sample). To distinguish between these conditions, a "pause flow flag" is used, this flag being set the first time that the pause feature is found to be on, and reset when pause feature goes off. (This is done later in the routine.) An inquiry is then made (diamond 1630) as to whether or not the pause flow flag is set. If not, condition 1 in a circle is indicated (i.e., pause was on during the previous sample). If this is the case, a pause counter is incremented (block 1631), this counter being used to keep track of the length of a pause, so that it can be determined when a "long pause" has occurred. The pause counter is then tested (diamond 1632) to determine if a long pause is evident. If not, return is made to the point in the main program from which the interrupt was effected. If the pause count is high enough to indicate a long pause, diamond 1633 is entered, and inquiry is made as to whether or not a "long pause flag" (used to prevent multiple long pauses) is set. If not, zeros are entered in the boundary stack memory 512 (FIG. 5) to indicate a long pause, as represented by block 1634. Next, the long pause flag is set (block 1635) and a counter, used to keep track of the number of speech segments in a string, is reset to zero (block 1636). Return to the point in the main program from which interrupt was made is then effected, as is also the case if the long pause flag was found to be on ("yes" output branch of diamond 1633).

Turning, now, to the "no" output branch of diamond 1620 (i.e., the pause feature "off"), diamond 1660 is entered, and inquiry is made as to whether or not a "data flow flag" is set, the data flow flag being used to distinguish between the first feature sample of a new segment (reference numeral 2 in a circle in FIG. 17) and any subsequent feature sample of a segment (reference numeral 3 in a circle of FIG. 17). If the data flow flag is not set, the beginning of a new segment is indicated, and block 1661 is entered so that the present input buffer address can be stored in a "beginning-of-segment" storage register ("BOSS"). Block 1662 is then entered, and the data flow flag is set, the pause flow flag is set, and long pause flag is reset. Also, a segment length counter is initialized (block 1663), and return is then made to the point in the main routine from which the interrupt was effected. If the inquiry of diamond 1660 was answered in the affirmative, (i.e., the present feature sample is part of a continuing segment—see reference numeral 3 in a circle in FIG. 17), block 1670 is entered and a segment length counter is incremented. Diamond 1671 is then entered and inquiry is made as to whether or not the segment length counter is greater than the prescribed maximum segment length (i.e., 1540 milliseconds or 700 samples for the present embodiment). If not, return is effected to the main routine. If so, however, the segment is considered as being terminated and block 1640 is entered so that the end-of-segment processing can be implemented.

Consider now the branch of diamond 1630 which indicated that the pause flow flag was set, thereby indicating condition 4 in a circle of FIG. 17 (i.e., pause just came on). In such case, block 1640 is entered, and the present input buffer address is stored in an "end-of-segment" storage register (EOSS). Block 1641 is then entered, and the size of the segment (which just ended) is determined by subtracting the beginning-of-segment address (in BOSS) from the end-of-segment address (in EOSS). Diamond 1642 is then entered and inquiry is made as to whether or not the computed segment size is less than the minimum allowable segment size. For example, in the present embodiment, a segment which is less than 22 milliseconds or 10 samples in duration is considered to be too short to process as a potential speech segment. If the segment is not less than the minimum size, diamond 1643 is entered and inquiry is made as to whether or not the boundary stack memory 512 (FIG. 5) is full. If not, the beginning-of-segment address in BOSS and the end-of-segment address in EOSS are stored (block 1644) in the boundary stack memory 512. The count of the number of segments in the string is then incremented, as represented by block 1645. Diamond 1646 is then entered and determination is made as to whether or not the number of segments in the string is greater than the prescribed maximum number of segments in a string (twelve, in the present embodiment). If not, block 1647 is entered, and the pause flow flag and data flow flag are reset, whereupon return is made to the point of the overall routine from which interrupt had been effected. The block 1647 is also directly entered from the "yes" output branch of diamond 1642. Also, if the answer to the inquiry of diamond 1646 was "yes", block 1634 is entered so that a long pause indication is entered in the boundary stack memory. The block 1634 is also entered from the "yes" output branch of diamond 1643, after temporary disabling of interrupts (block 1648).

Figure 18A:
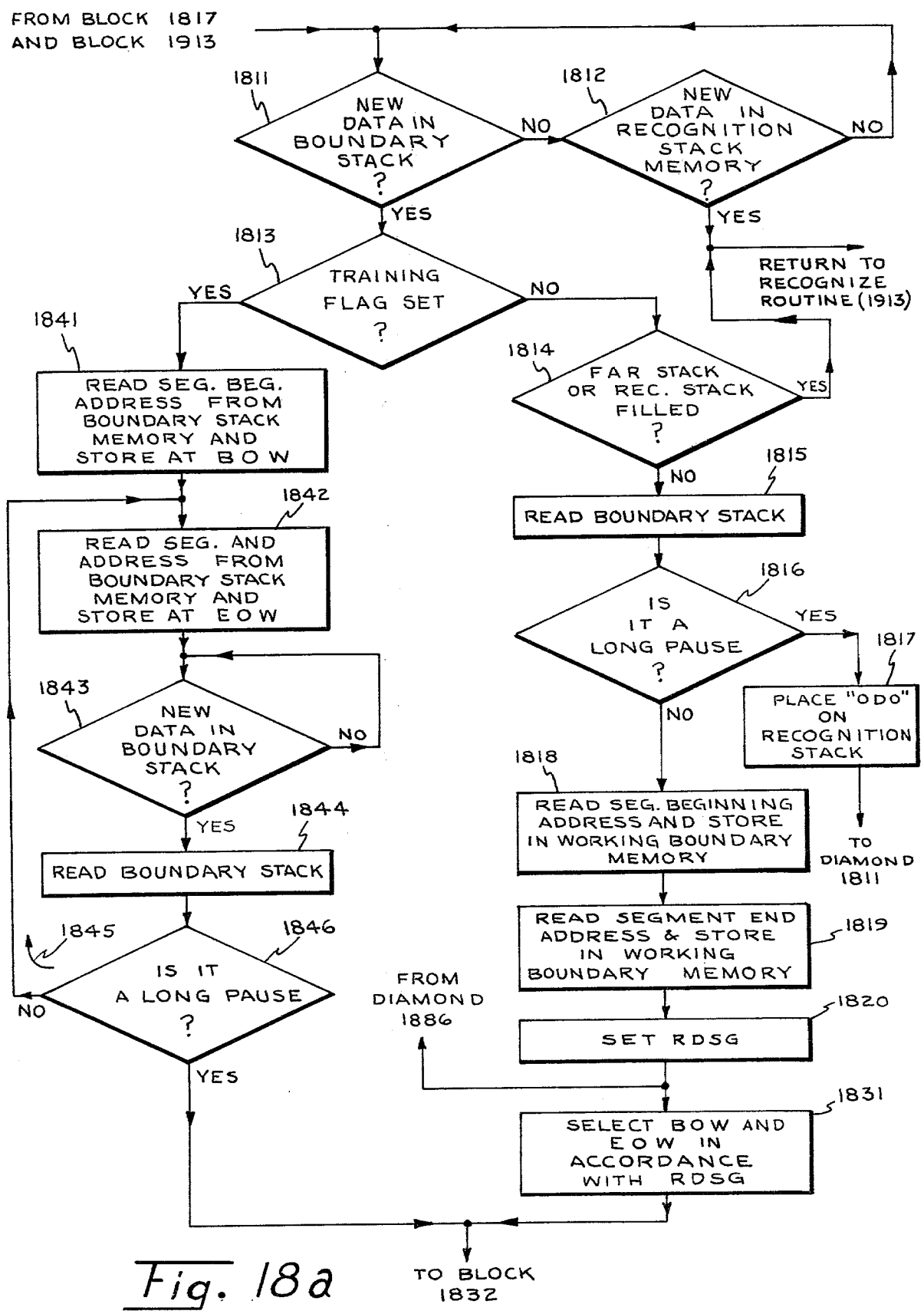
FIGS. 18A, 18B, and 18C together show a flow diagram of the reduce routine of FIG. 5.
Figure 18B:
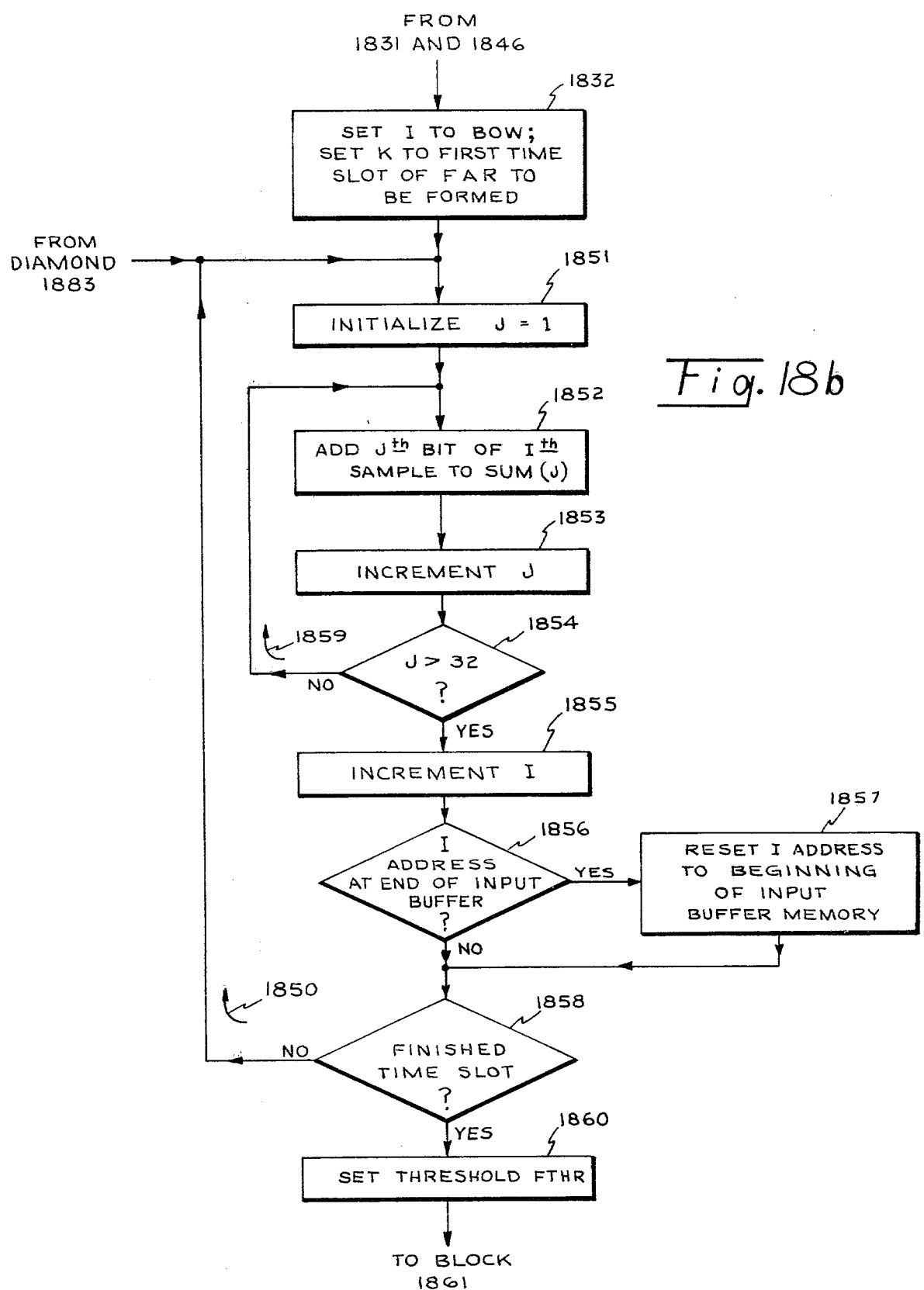
Figure 18C:
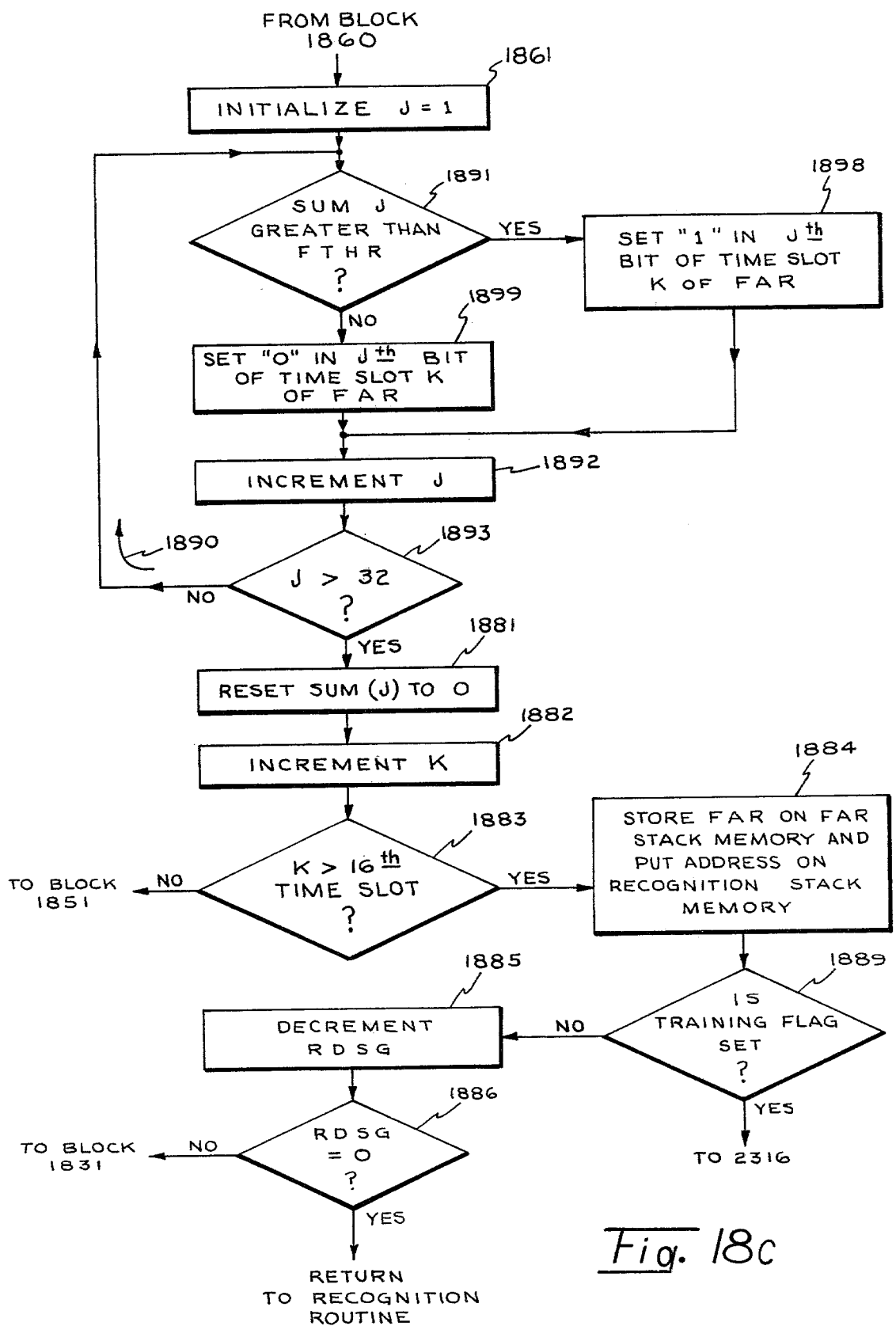

Referring to FIG. 18, there is shown a flow diagram of the "reduce" routine represented by the block 520 of FIG. 5. Diamond 1811 is entered first (entry to the "reduce" routine being effected from various places in the main routine, as will be described) and inquiry is made as to whether there is data to be processed in the boundary stack memory 512. If not, diamond 1812 is entered and inquiry is made as to whether or not there is new data in the recognition stack 522. If so, return is made to the recognize routine (diamond 1915 of FIG. 19). If not, diamond 1811 is reentered and the small loop will continue until an interrupt occurs, whereupon new data will eventually be put into the boundary stack memory 512. If, in accordance with the inquiry of diamond 1811, data to be processed was found to be present in the boundary stack, diamond 1813 is entered, and inquiry is made as to whether or not the training flag is set. (The training flag is set during the training routine 550, to be described, when the equipment is being "trained" with a new vocabulary, or for a new speaker.) As will be explained below, during training the reduce routine is used somewhat differently than during operation (i.e., toward production of RARs rather than FARs) and description of the blocks entered from the "yes" output branch of diamond 1813 will be deffered until later. If the training flag is not set (indicating regular operational mode) diamond 1814 is entered, and inquiry is made as to whether or not the FAR stack memory 521 or the recognition stack memory 522 is filled. If so, there will be nowhere to put newly processed FARs, so return is made to the recognize routine (which processes, and therefore tends to clear, these stacks). If the answer to the inquiry of diamond 1814 is in the negative, the boundary stack 512 is interrogated (block 1815), and inquiry is then made (diamond 1816) as to whether all-zeros (a long pause indication) is the next item on the boundary stack. If so, all-zeros (a long pause indication) is placed on the recognition stack memory 522 to denote a long pause at the appropriate place thereon (block 1817). Diamond 1811 is then reentered so that the next item on the boundary stack can be considered. If the inquiry of diamond 1816 did not indicate a long pause, the next pair of segment boundaries (a beginning and an end) are read from the boundary stack (blocks 1818 and 1819), and the addresses thereof are placed in a "working" boundary memory which holds the present pair of beginning and end boundaries, as well as the previous three pairs of beginning and end boundaries of the string (if any). (In other words, the working boundary memory always holds the last four pairs of segment boundaries taken off the boundary stack during the current string.) As previously described, for example, in conjunction with FIG. 8A, four "reduce" operations (to produce FARs) will generally be performed for each new segment being processed (except that there will be less "reduce" operations for the first three segments—see FIGS. 8B, 8C and 8D). An index designated RDSG is used to keep track of which of the four FARs is being formed for the segment being processed (i.e., the segment whose boundaries were just taken from the boundary stack 512). As represented by block 1820, RDSG is initiated at four, which means that the first reduce produces a FAR for the present segment as being the last segment of a 4-segment word. Similarly, when RDSG is 3, 2, or 1, a FAR is produced with the present segment as the last segment of a 3-segment, 2-segment, or 1-segment word, respectively (see FIG. 8A). For RDSG equals 4, the reduce routine being described uses the beginning-of-segment address of the third segment back from the current segment as the beginning of the word for which a FAR is to be formed. For RDSG equals 3, the routine uses the beginning-of-segment address of the segment which is two segments back from the current segment as the beginning of the word for which a FAR is to be formed, and so on. In each case, the end of the word for which the FAR is to be formed is the end-of-segment address of the current segment. As described above in detail, for the first segment of a string only one FAR is formed (with RDSG=4), so the routine can skip through RDSG=1, 2, or 3 for this segment. Similarly, for the second and third segment of a string, the routine can respectively skip through RDSG=1 and 2, and RDSG=1, respectively. In the flow diagram of FIG. 18, block 1831 is entered and the beginning-of-segment address of the appropriate previous segment (in accordance with RDSG, as just explained) is initialized as a beginning-of-word ("BOW") address, and the end-of-segment address of the current segment is used as an end-of-word ("EOW") address. Block 1832 is next entered, and an index I is set to the address BOW and another index K is set to the first time slot of the FAR array to be formed. During the loop 1850 which follows, a column of the feature array (FAR) to be formed begins to be constituted by summing the number of times that a feature is present during the first 1/16th of the time samples of the word in question. For example, with regard to the illustration of FIGS. 3 and 4, this is equivalent to looking, for each of the 32 features, at the number of times the feature is present during the first bracketed portion of time samples $B_1$ in the array of FIG. 3. A threshold is then set (block 1860) which, in the present embodiment, requires that the feature be present for at least one-quarter of the time samples in question. Then, the loop 1890 below is used to determine whether each cumulative number of occurrences for the bracketed time samples in question exceeds the determined threshold. If so, a "1" is put at the time-normalized bit position for the feature in question (e.g. a member of the time normalized array shown in FIG. 4) of the FAR being formed. If not, a "0" is put at the appropriate array position of the FAR being formed. These functions are represented by blocks 1898 and 1899, respectively, of the loop 1890 below.

Returning to the beginning of the loop 1850, an index J, which is used to index the 32 features, is initialized at 1 (block 1851). Block 1852 is then entered, this block representing the addition of the Jth bit of the Ith sample to an accumulation designated SUM (J). J is then incremented (block 1853) and J is tested to see if it is greater than 32 (diamond 1853). If not, block 1852 is reentered and the small loop 1859 is continued until all 32 feature bits of the present (Ith) sample have been added appropriately to the cumulative sums being formed. When the loop 1859 is complete, block 1855 is entered and the address I incremented (to process the next time sample of data in the input buffer memory 511). Diamond 1856 and block 1857 are then used to check whether the I address is at the end of the input buffer memory 511 and, if so, I is reset to the beginning of the input buffer memory, as previously described ("wrap-around"). Diamond 1858 is then entered and determination is made as to whether all the samples within the time slot K have been considered. As discussed above, time slot K (of the time-normalized FAR being formed) includes 1/16th of the time samples between BOW and EOW. When the loop is complete, block 1860 is entered and the FAR threshold, discussed above, and designated "FTHR", is established as ¼ of the number of time samples in the time slot K. For a time slot K=1/16 of (EOW-BOW), the threshold would be FTHR=(1/64) (EOW-BOW).

The block 1861 of FIG. 18 is next entered and J is again initialized at 1. The loop 1890 is then entered and, as described above, J incremented through all 32 features and, at each feature bit position (for the present Kth time slot), the sum SUM (J) is tested (diamond 1891) to see if it is greater than the threshold FTHR. If so, block 1898 is entered and a "1" is set at the Jth bit position of time slot K of the FAR being formed. If not, block 1899 is entered, and a "0" is put at the stated bit position. J is then incremented (block 1892). After completion of loop 1890, i.e., when the test of diamond 1893 indicates that J is greater than 32, block 1881 is entered and all SUM (J) are reset to zero. K is then incremented (block 1882) and tested (block 1883) to determine if all sixteen time slots of the FAR have been composed. If not, block 1851 is reentered so that the 32 bits of the next time slot of the FAR can be generated. When the test of diamond 1883 indicates that the FAR has been composed, block 1884 is entered, this block representing storage of the FAR on the FAR stack memory 521, and the placing of the FAR stack address on the recognition stack memory 522. The training flag is tested (diamond 1889). The index RDSG is then decremented (block 1885) and diamond 1886 is entered to determine if all "reduces" have been performed. If not, block 1831 is entered to begin composition of the next FAR associated with the current segment. The routine then continues until all required FARs (up to 4) have been formed for the current segment. At this time the "yes" output branch of diamond 1886 is coupled to block 1911, which is at the beginning of the "recognize" routine to be described next.

Figure 19A:
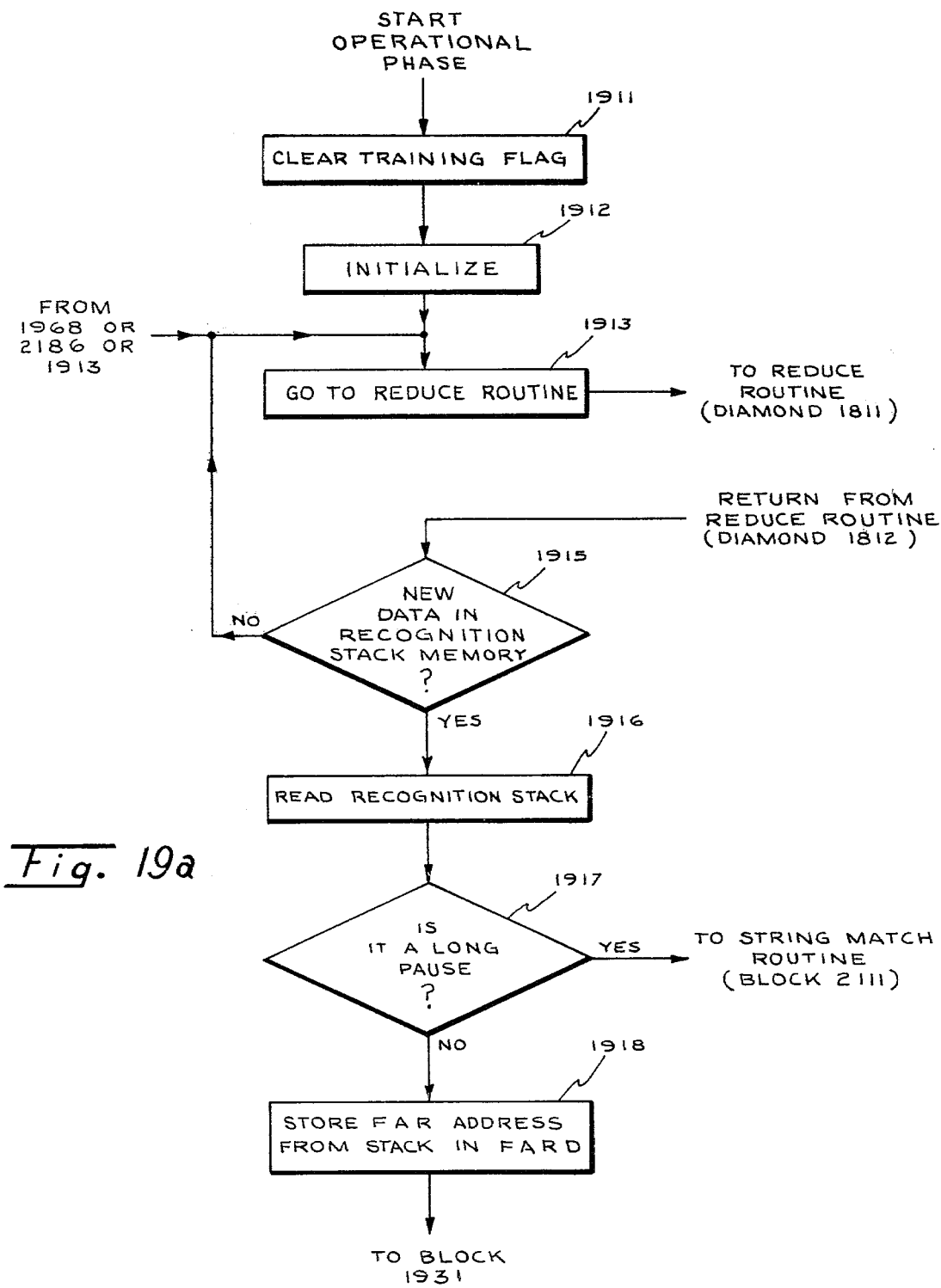
FIGS. 19A, 19B, and 19C together show a flow diagram of the recognize routine of FIG. 5.
Figure 19B:
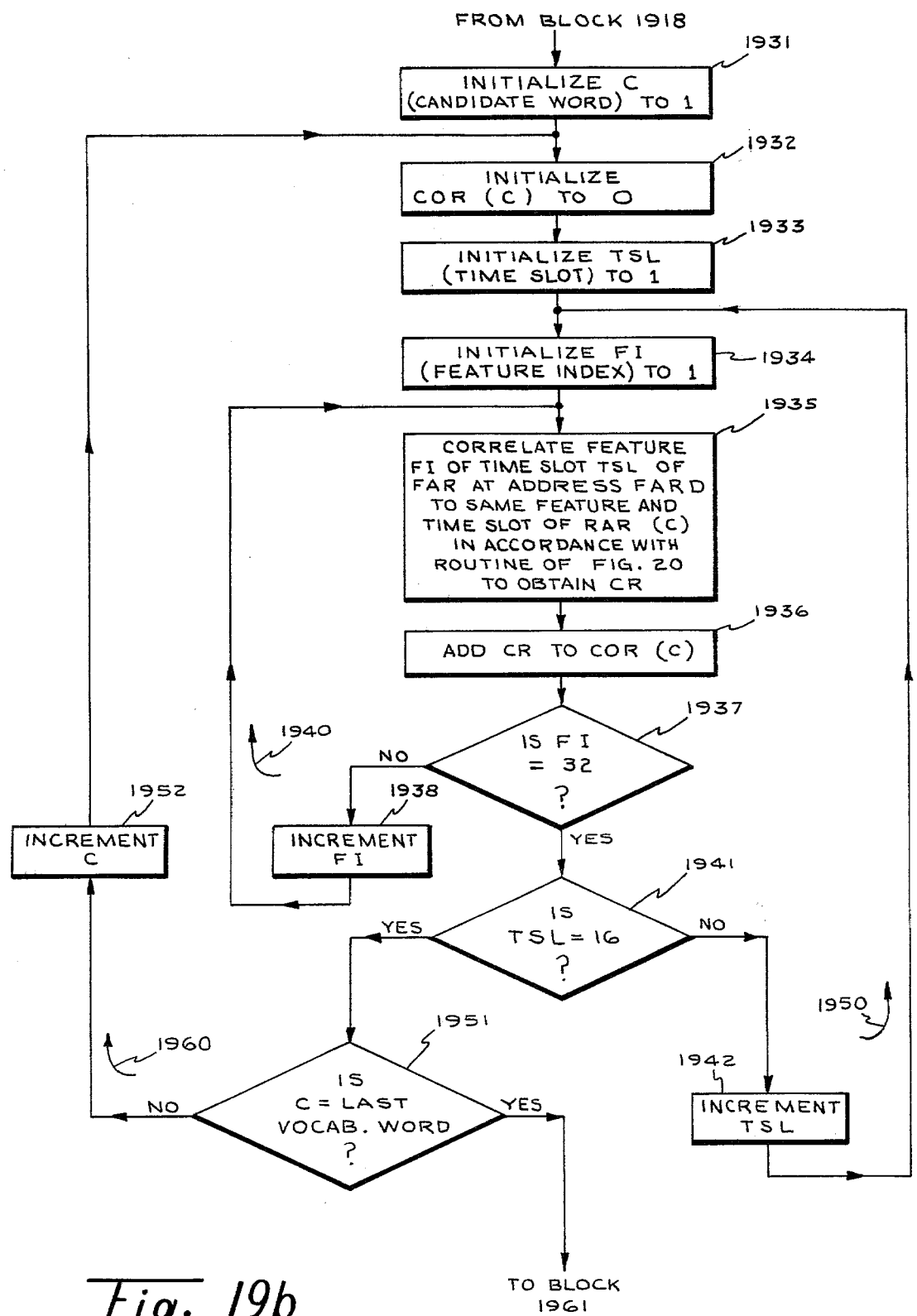
Figure 19C:
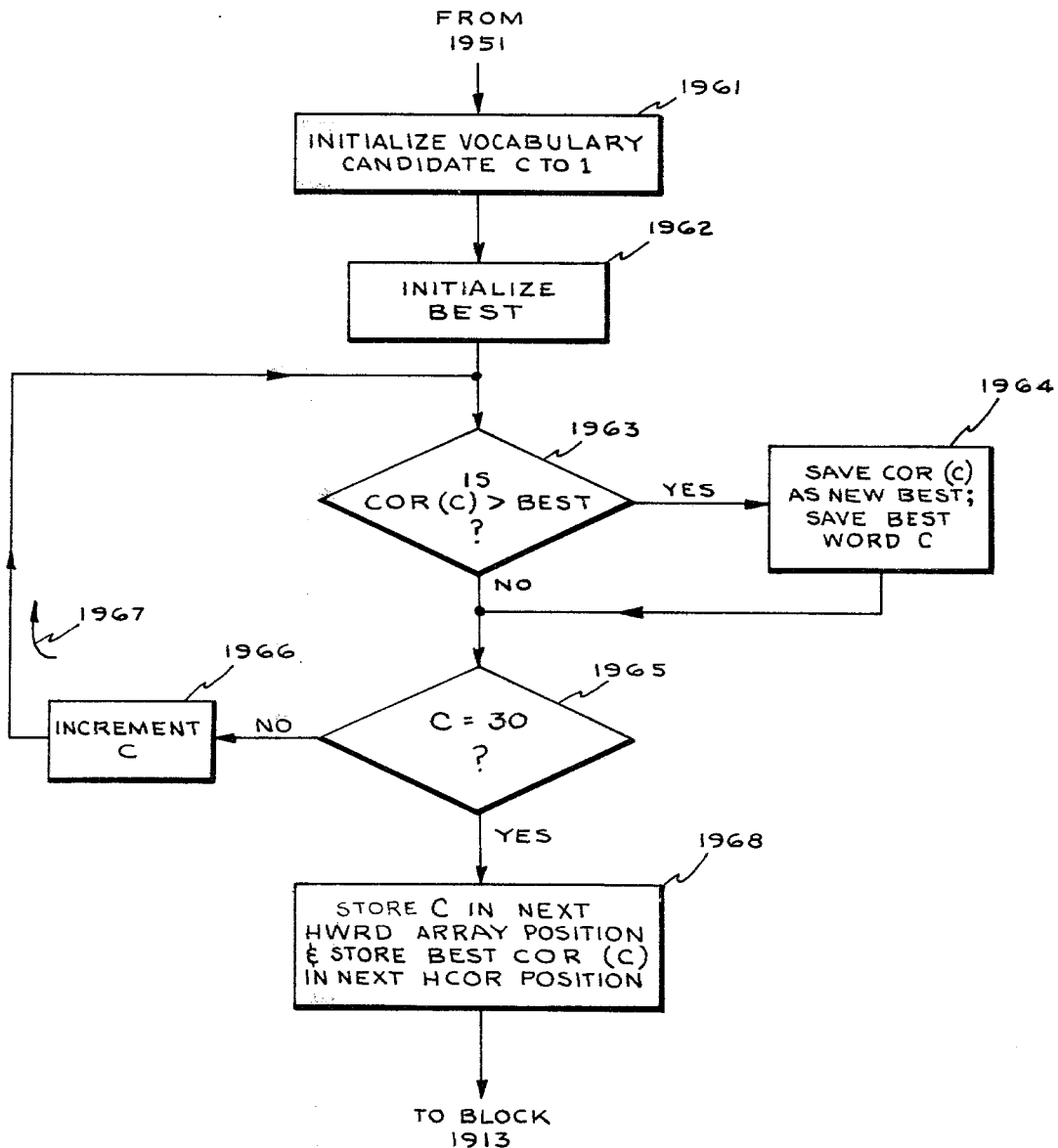

Referring to FIG. 19, there is shown a flow diagram of "recognize" routine 530 of FIG. 5. In the present embodiment, the start of the recognition routine can also be considered as the start of the overall flow diagram (although it will be understood that, if desired, other start points could be used since the routing between routines does not depend upon a particular start point.) The block 1911 represents the clearing of the training flag (which is set for the training phase). The block 1912 represents the initializing of flags, pointers, counters, etc., used in the overall flow diagram. The block 1913 is then entered, and transfer is effected to the start of the "reduce" routine (diamond 1811—FIG. 18). When the reduce routine is idle, return to the recognize routine is effected (arrow 1914). Diamond 1915 is then entered, and inquiry is made as to whether or not there is new data in the recognition stack memory. If not, block 1913 is reentered. If so, however, the recognition stack is read, as represented by block 1916. Determination is then made as to whether what was read from the recognition stack was all zeros (long pause indication), as indicated by diamond 1917. If so, the end of a string is indicated, and block 2111 of the string match routine (FIG. 21) is entered. If it was not a long pause, block 1918 is entered and the address of the FAR read from the recognition stack memory is stored at a location designated "FARD". As explained above, during the "recognize" routine each FAR is correlated against each vocabulary word and, for each FAR, there is stored a record of the particular vocabulary word which yields the highest correlation (this being stored in the array HWRD of string match memory 531—see FIG. 10) and a record of said highest correlation score (this being stored in the array HCOR of the string match array—also FIG. 10). As also previously described, for each string there will be up to 48 members in each of the arrays HWRD and HCOR. It was noted above that the present embodiment forms reference arrays (RARs) for the vocabulary words which include two binary numbers at each reference array position. There is a "presence" bit which represents the presence or absence of a particular feature during training utterances, and a "consistency" bit which is indicative of the consistency of occurrence of the feature during a number of repetitions of training utterances of the particular vocabulary word. Continuing with the description of the flow diagram of FIG. 19, a block 1931 is entered and an index C is initialized at 1, this index being used to keep track of which vocabulary word (i.e., which of the thirty vocabulary words, in the present embodiment) is presently being considered as the candidate for the best correlation with the FAR being processed. Block 1932 is then entered and COR (C), which is used to keep a cumulative sum of the correlation score during the correlation of the FAR with the RAR for vocabulary word C, is initialized at zero. An index TSL, used to keep track of the array's time slot (the normalized time slots running from 1 to 16 in the present embodiment) is initialized at 1 (block 1933). Another index, FI, used to keep track of the array feature (32 features being used in the present embodiment), is also initialized at 1 (block 1934). The block 1935 is then entered and a correlation is performed between feature FI of time slot TSL of the FAR (at the address FARD) and the same feature and time slot position of the reference array RAR (C). The correlation is in accordance with the correlation rules set forth hereinbelow in Table I and the routine for implementing this correlation between array members is set forth in FIG. 20. The result of the correlation is a number designated CR. The individual correlation result, CR, for this array position is added to the overall correlation score for this vocabulary candidate, COR (C), as indicated by block 1936. Index FI is then tested to determine if all features of the particular time slot have been considered (diamond 1937) and, if not, FI is incremented (block 1938) and the loop 1940 is continued until all features for the particular time slot (e.g. a column of FIG. 4, for example) have been considered. When the loop 1940 is complete, diamond 1941 is entered and inquiry is made as to whether the last time slot has been reached. If not, the time slot index is incremented (block 1942) and the loop 1950 is then continued until all time slots have been considered. Subsequently, diamond 1951 is entered, and inquiry is made as to whether or not all vocabulary words have been considered as candidates (i.e., all 30 vocabulary words, in the present embodiment). If not, the candidate index C is incremented (block 1952) and the main loop 1960 (which, of course, includes the two subsidiary loops previously described) is continued until the total correlation score COR(C) has been obtained for each vocabulary candidate C for the present FAR.

After a correlation score has been obtained for each vocabulary word (RAR) when compared to the FAR being considered, the next portion of the FIG. 19 routine is used to select the vocabulary word whose RAR resulted in the highest correlation score, the identity of this vocabulary word being placed in the next position of the array HWRD (FIG. 10) of string match memory 531. Also, said highest correlation score is stored in the next position of the array HCOR (also FIG. 10) of the string match memory 531. In particular, block 1961 is entered and the vocabulary word candidate index C is initialized to one. A variable designated BEST, used to keep track of the highest correlation score considered in the subsequent loop, is initialized at an arbitrarily low value (e.g. zero), as represented by block 1962. Diamond 1963 is then entered, and determination is made as to whether or not COR(C) is greater than BEST. If so, COR(C) is saved as the new BEST, and the value of index C which produced the best correlation (so far) is also saved, as represented by block 1964. The diamond 1965 is then entered (this diamond also having been entered directly from the "no" output branch of diamond 1963), and determination is made as to whether or not the last vocabulary word has been reached. If not, index C is incremented and the loop 1967 is continued until the correlation scores associated with all vocabulary words have been considered. When the loop is complete ("yes" output from diamond 1965), the saved C is stored in the next position of the HWRD array and the saved BEST is stored in the next position of the HCOR array (in both cases, this meaning the next available position, for the case of the first three segments, as was explained above). Block 1913 is then reentered and the reduce routine 520 is returned to. When the reduce routine is again idle, return is effected to the recognize routine (as explained above) via diamond 1915, and the next FAR is processed in accordance with the FIG. 19 routine.

Figure 20:
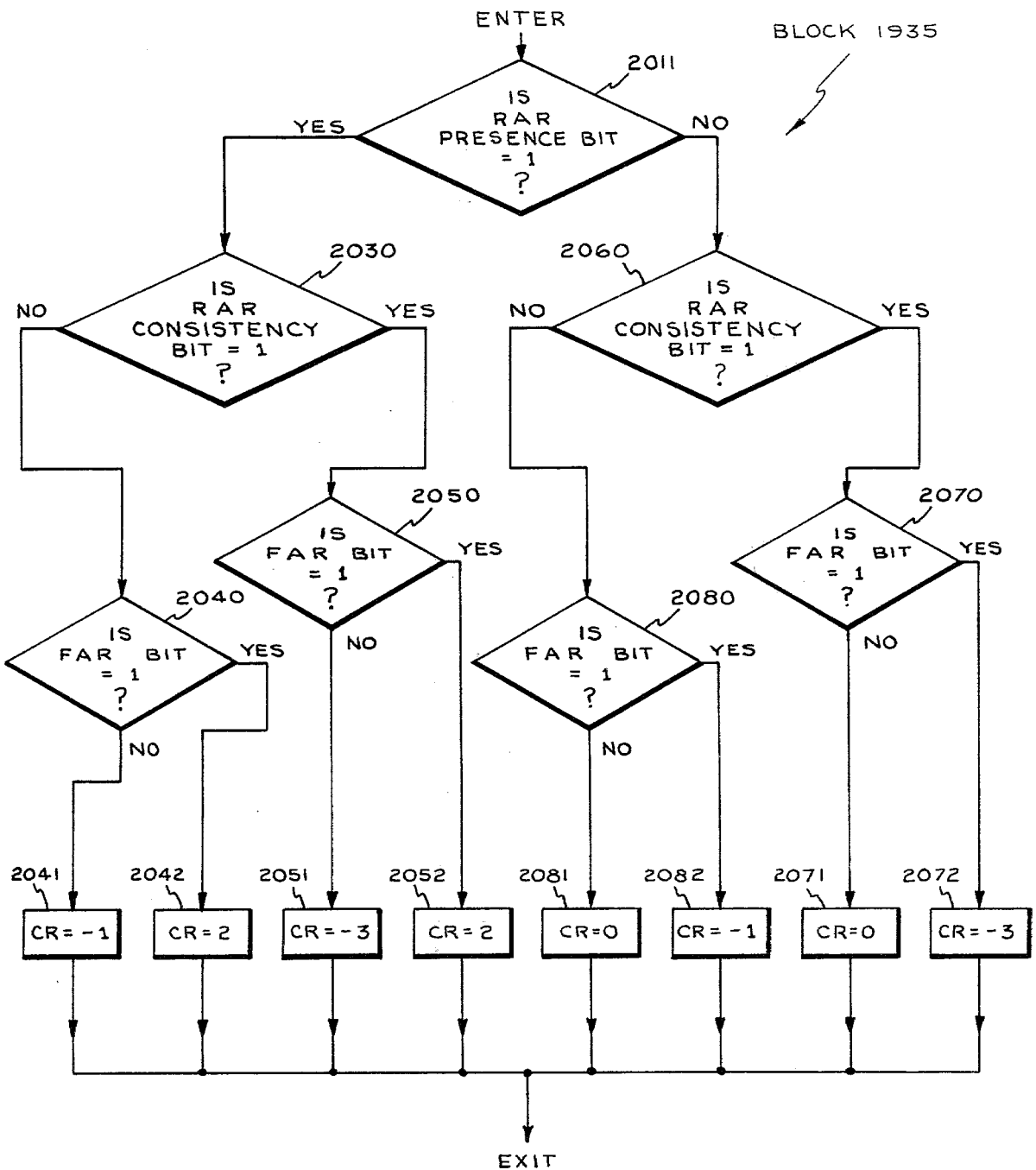
FIG. 20 is a flow diagram of a routine for obtaining weighted correlation values when comparing array members of a reference array and a feature array, and is used in conjunction with the routine of FIG. 19.

Referring to FIG. 20, there is shown a flow diagram of the correlation technique, represented by block 1935 of FIG. 19, and used to obtain weighted correlation figures from the comparison of each array member of a feature array (FAR) with a corresponding member of a vocabulary word reference array (RAR). It will be recalled that at each array position of the RAR there are two binary bits; i.e., a "presence" bit that is indicative of presence or absence of the feature (during the time slot in question) during at least a minimum defined fraction of the training utterances of the vocabulary word in question, and a "consistency" bit that is indicative of the consistency of occurrence of the feature (at the particular time slot) during a number of training utterances of the vocabulary word. It will be understood that the reference array (RAR) can alternately be viewed as two arrays; viz., one array of "presence" bits and another array of "consistency" bits. As defined herein, a reference array (RAR) having two bits at each array position is equivalent to two arrays having one bit at each array position and together containing the same information as the single array. In FIG. 20, diamond 2011 is first entered and inquiry is made as to whether the RAR "presence" bit is a "1". If so, diamond 2030 is entered and, if not, diamond 2060 is entered. Considering diamond 2030 first, inquiry is made as to whether or not the RAR "consistency" bit is a "1". If so, diamond 2050 is entered and, if not, diamond 2040 is entered. In the case of diamond 2060, inquiry is also made as to whether the RAR "consistency" bit is a "1". In this case, if it is a "1", diamond 2070 is entered and if it is a "0", diamond 2080 is entered. The diamonds 2040, 2050, 2070 and 2080 each represent inquiry as to whether the bit (being processed) of the FAR is a "1". The "no" and "yes" output branches of the diamonds 2040, 2050, 2080 and 2070 are respectively coupled to the eight blocks labeled 2041, 2042, 2051, 2052, 2081, 2082, 2071 and 2072, respectively. Each of these blocks represents the selection of a correlation weighting value, CR. The weighting values are summarized in Table I.

TABLE I

| FAR bit | RAR presence bit | RAR consistency bit | correlation weight (CR) |
|---|---|---|---|
| 0 | 0 | 0 | 0 |
| 0 | 0 | 1 | 0 |
| 0 | 1 | 0 | −1 |
| 0 | 1 | 1 | −3 |
| 1 | 0 | 0 | −1 |
| 1 | 0 | 1 | −3 |
| 1 | 1 | 0 | 2 |
| 1 | 1 | 1 | 2 |

In accordance with the present embodiment, a match between "1"s in the FAR and the "presence" bit of the RAR is assigned a positive correlation weighting of +2. (It will be understood that a positive correlation score is taken herein to represent a degree of "good" correlation or "match" and a negative score taken to represent a degree of "mismatch". However, it will be understood that an opposite polarity convention could be employed if desired.) This is the case regardless of the status of the consistency bit of the RAR. A match between "0"s is assigned a correlation weight of 0 (i.e., given no correlation weight), regardless of the status of the consistency bit of the RAR. The remaining possibilities in Table I involve "0" to "1" mismatches between the FAR bit and the "presence" bit of the RAR (and vice versa). In the case of mismatches, however, the status of the RAR consistency is strongly determinative of the correlation weighting to be used, as applicants have found that this is most advantageous in obtaining overall correlation scores that are more accurately indicative of the degree of similarity between a RAR and a FAR. In the present embodiment, a mismatch when the consistency bit is "0" (indicating a degree of uncertainty regarding the particular feature presence or absence at the particular time slot as observed during a number of training utterances of the vocabulary word) is assigned a weighting value of −1. On the other hand, the same mismatch, if the RAR consistency bit is "1" (indicating consistency regarding the particular feature presence or absence at the particular time slot during a number of training utterances of the vocabulary word), is assigned a weighting value of −3.

Referring to FIG. 21, there is shown a flow diagram of the string match routine 540 (FIG. 5). The first portion of the routine is used to "weight" the correlation scores stored in the array HCOR (FIG. 10) of the string match array memory 531 (FIG. 5). As previously described, the array "HCOR" stores up to 48 correlation scores; i.e., four scores for each of up to twelve speech segments of a string of speech segments. As will be recalled, for each speech segment, the array HCOR stores the best correlation score (obtained by trying all vocabulary words) for the segment when considered as each of the following: the last speech segment of a four-segment word; the last speech segment of a three-segment word; the last speech segment of a two-segment word; and the only speech segment of a one-segment word. In order to render meaningful the comparison of overall correlation scores over a plurality of segments, the correlation scores in the array HCOR are "weighted" in accordance with the number of segments they include. In particular, the correlation scores which include one segment are weighted by a weighting factor of 1, the correlation scores that include two segments are weighted by a weighting factor of 2, the correlation scores which include three segments are weighted by a weighting factor of 3, and the correlation scores which include four segments are weighted by a weighting factor of 4. In particular, in the flow diagram of FIG. 21, a block 2111 is entered and an index I is initialized at 1. The value HCOR(I) is then multiplied by 4, as represented by block 2112. I is then again incremented (block 2113) and HCOR(I) is multiplied by 3 (block 2114). Next, I is again incremented (block 2115) and the correlation score located at HCOR(I) is multiplied by 2 (block 2116). I is then incremented twice, as represented by block 2117. Diamond 2118 is then entered, and inquiry is made as to whether I equals four times the number of segments in the string (see block 1645 where number of segments in a string is kept track of); i.e., whether the last member of HCOR has been reached. If so, the entire array has been weighted. If not, block 2112 is reentered and the next four correlation scores of HCOR are weighted. The loop 2120 continues until all members of HCOR have been weighted, whereupon the answer to the inquiry of diamond 2118 is positive and the next portion of the routine is entered.

The next portions of the routine of FIG. 21 deal with the formation and processing of the SCOR array of FIG. 15 and the generation of appropriate pointer values in the pointer array SPNT (FIG. 14) which was described above and is used to point back from the last segment of a string through the best overall path. A block 2121 is first entered and an index L is set to to zero. (It will be recalled that L represents the number of segments back from the current segment in the SCOR array.) SCOR(O,L) is then set equal to 0, as represented by block 2122. Diamond 2123 is then entered, and determination is made as to whether or not L is 4. If not, block 2124 is entered, and L is incremented. The loop 2125 continues until L equal 4. In this manner the zeros are initially loaded into the bottom row of the SCOR array.

Figures 21A, 22:
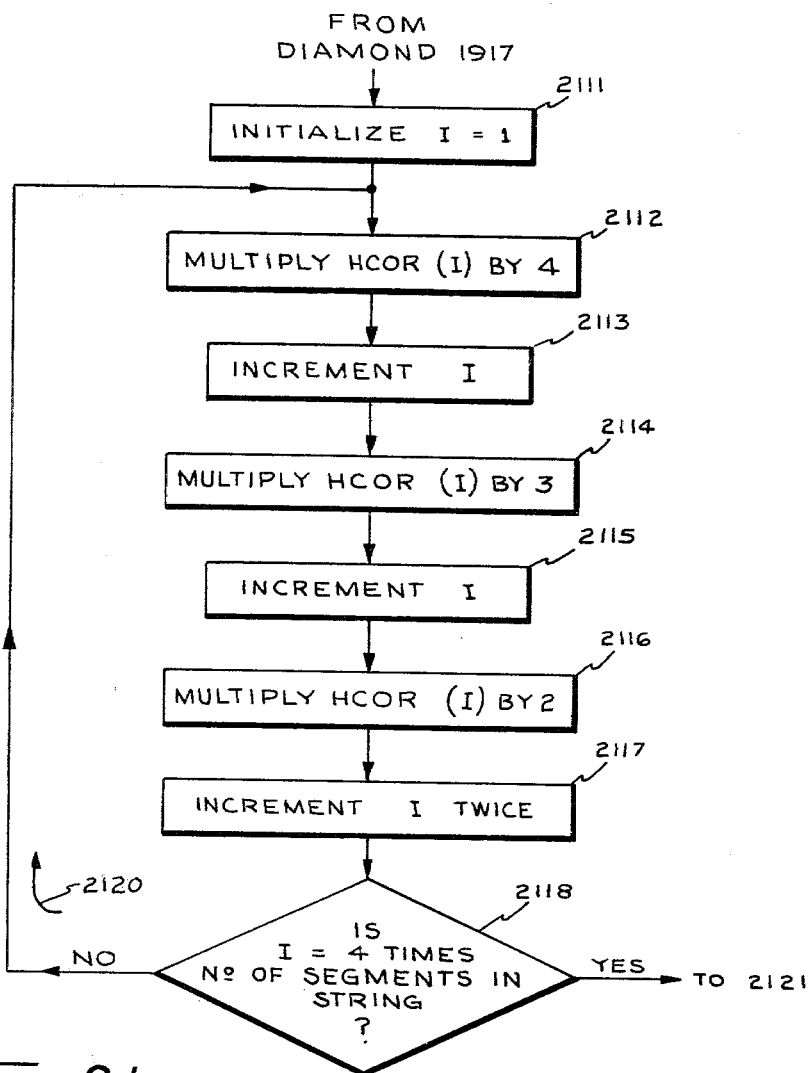
FIGS. 21A, 21B, 21C, 21D, and 21E together show a flow diagram of the string match routine of FIG. 5.
FIG. 22 is a table which shows how limits of the segment versus word plot are used in the string match routine.
Figure 21B:
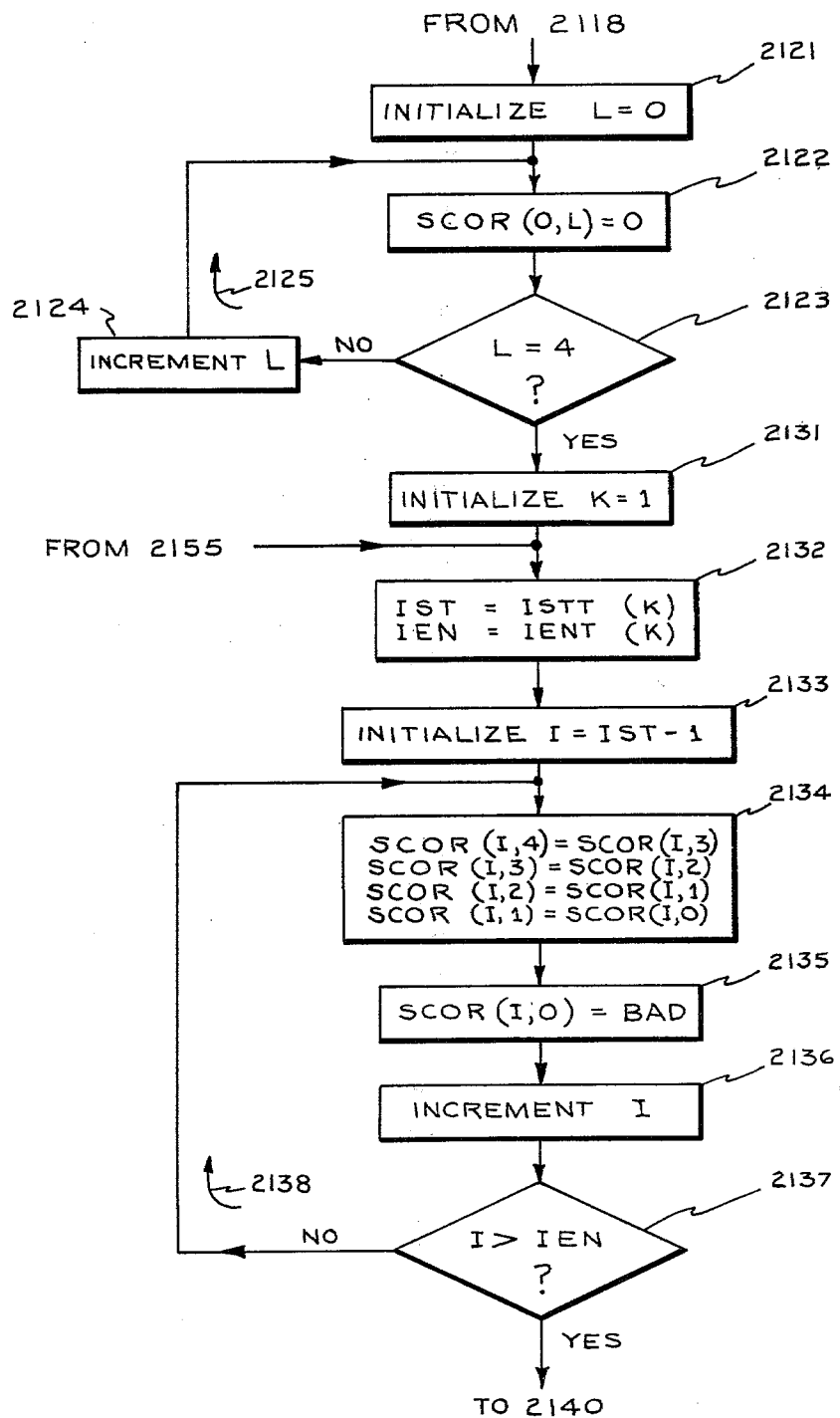
Figure 21C:
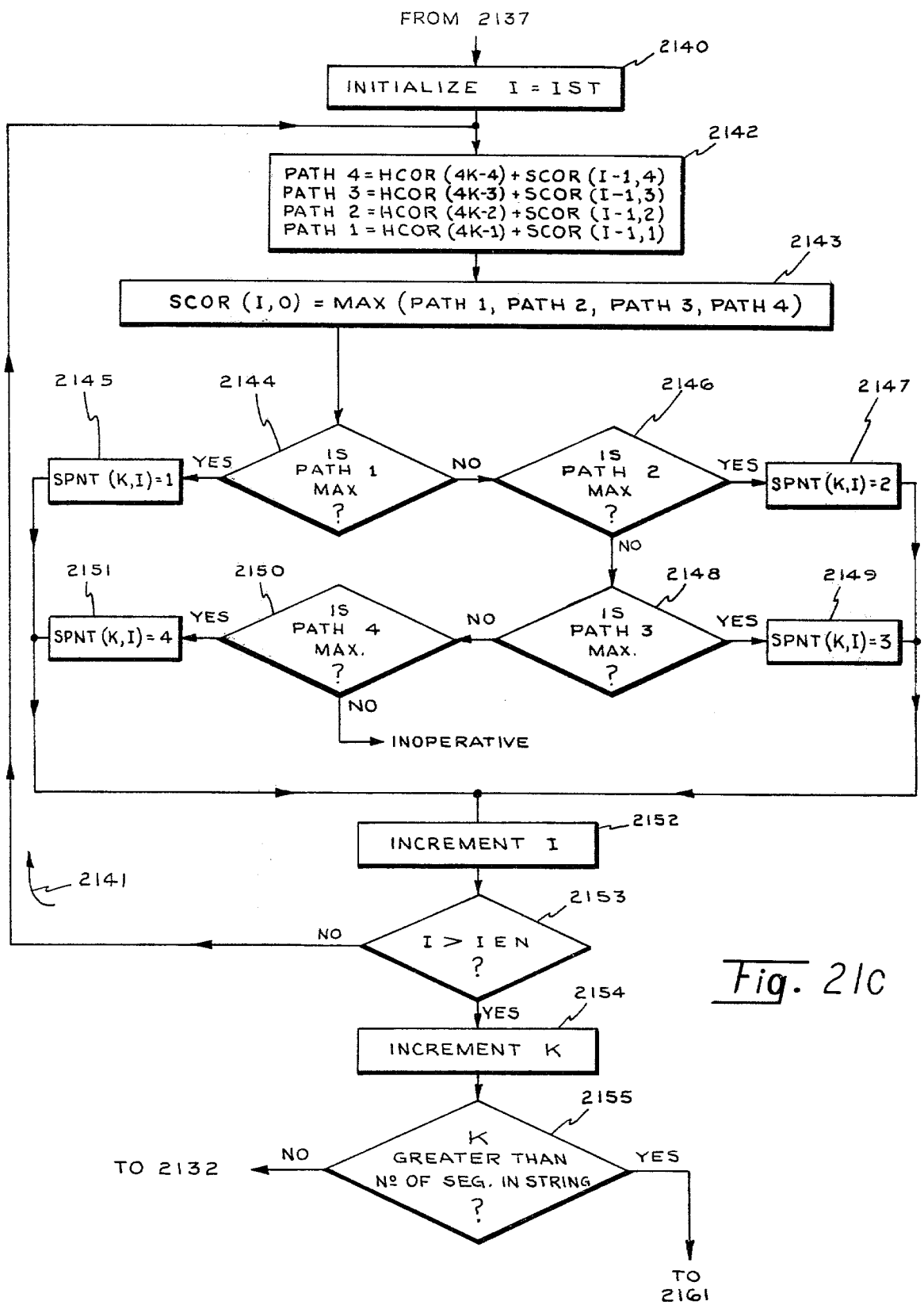
Figure 21D:
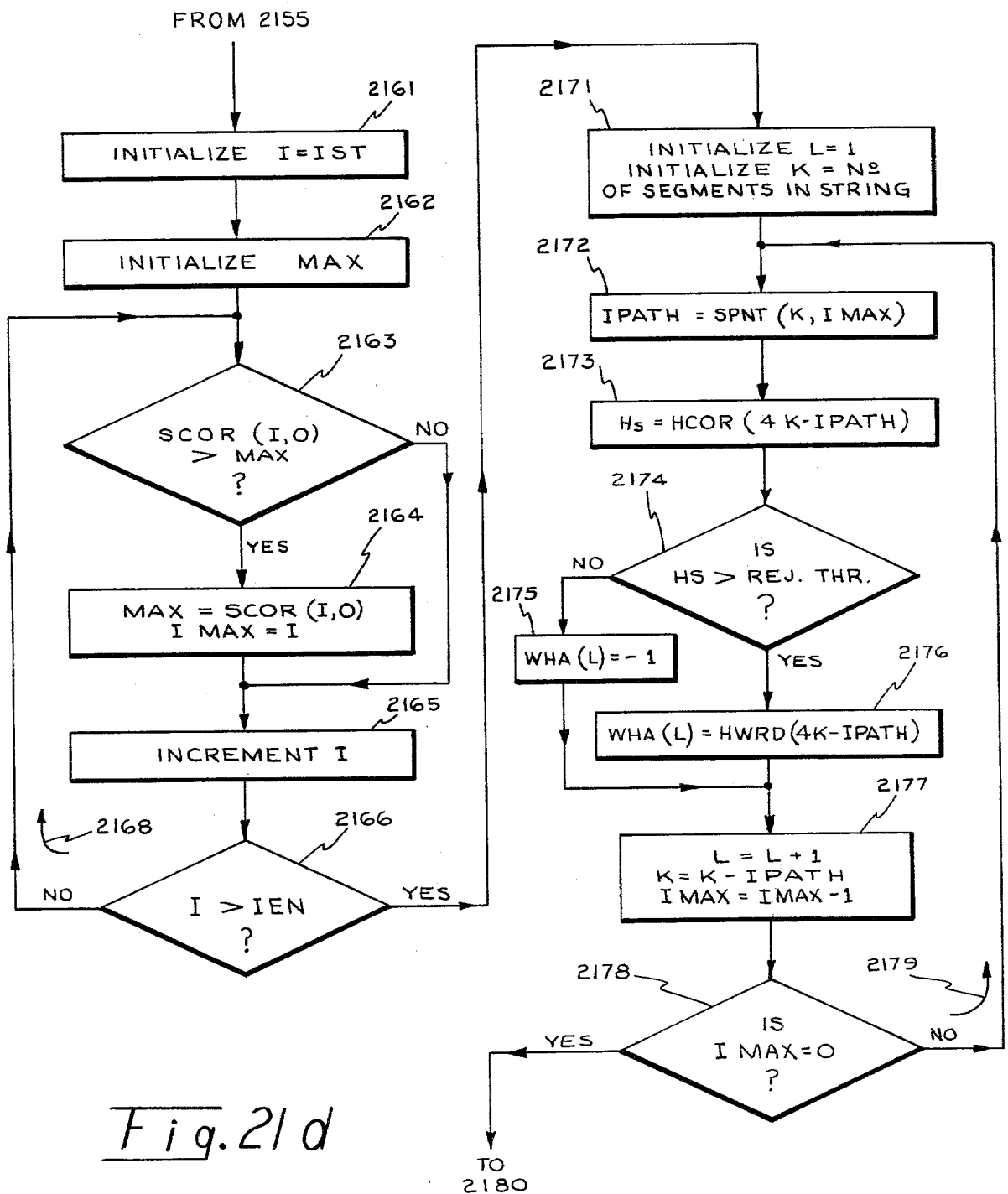
Figure 21E:
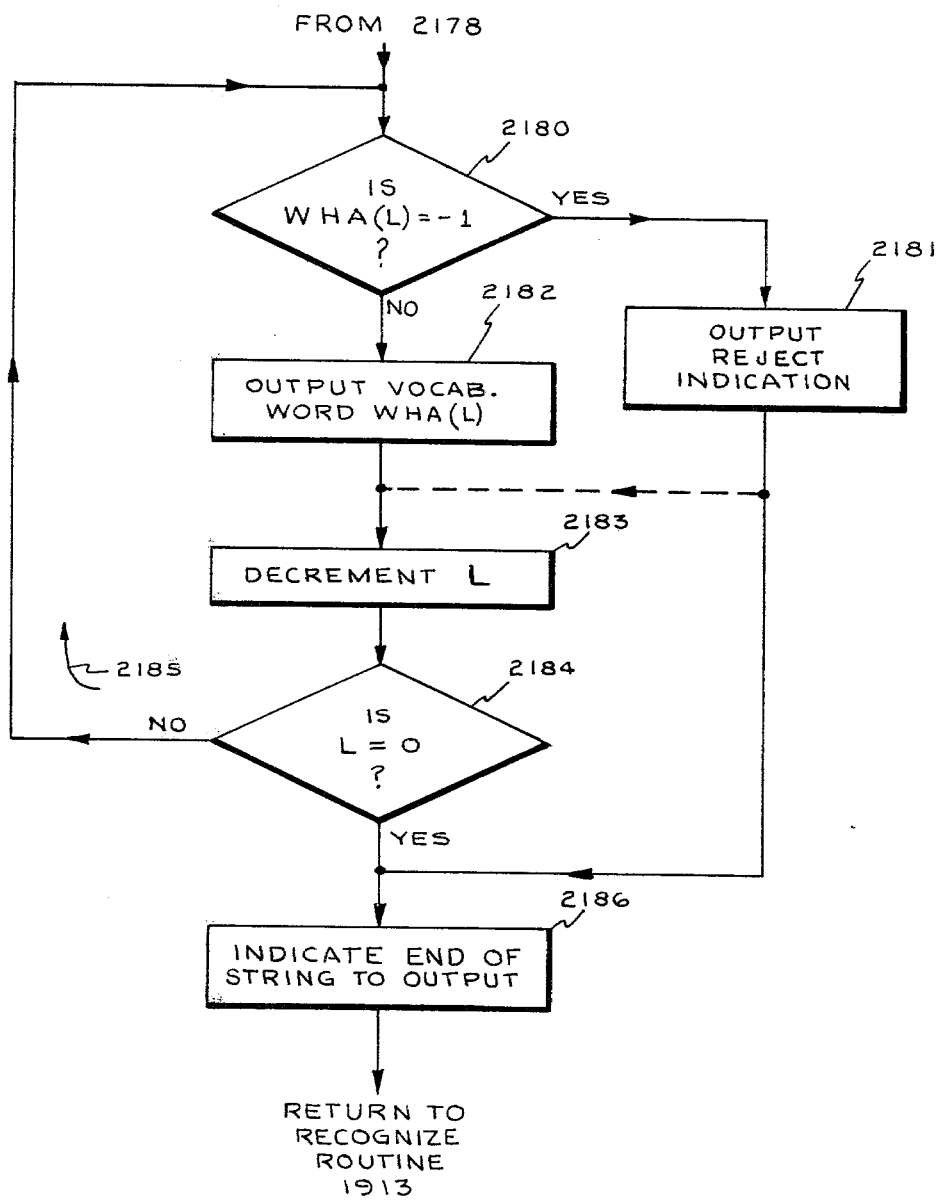

The block 2131 is next entered and an index K is initialized at 1. This index can be visualized as representing the number of the speech segment of the string that is currently being processed. The block 2132 is entered, and numbers designated IST and IEN are obtained from a stored table, shown in FIG. 22. The values stored in the table are designated as ISTT(K) and IENT(K). It can be seen from the table that ISTT(K) represents the bottom boundary line having the designation XB in FIG. 11, and IENT represents the boundary line having the designation XA in FIG. 11. In other words, as a function of the segment index number (K), the values IST and IEN derived from the table of FIG. 22 represent the predetermined boundary limits within the segment versus word plot of FIG. 11 (or FIG. 12). The block 2133 is next entered and an index I is initialized at IST-1. The block 2134 is then entered, the Ith row of the SCOR array is shifted to the left by one column, this being done by moving each of the four correlation scores therein by one position. Block 2135 is then entered and a score designated BAD is entered at the position SCOR (I,O). A bad correlation score, (a negative value) is placed at this position of the SCOR array, this being done so that when this bad correlation score is added to certain inoperative paths, inferior correlation scores (which will be ignored as compared to other better correlation scores) will result. Block 2136 is then entered, and I is incremented. I is then tested to determine if it is greater than IEN (diamond 2137). If not, the loop 2138 is continued as shifting in the SCOR array is performed for all values of I between IST-1 and IEN.

The index I is next initialized to IST (block 2140). The loop 2141 is then entered, each pass through this loop being used to compute the best path to the point (I,K). In terms of the SCOR array, wherein the column of points being processed is the zero column of the "SCOR" array, this amounts to obtaining a value for SCOR (I,O). In the loop 2141 the block 2142 is first entered and overall correlation scores to the point (I,O) of the SCOR array are computed in accordance with the following relationships:

PATH 4 = HCOR(4K−4) + SCOR(I−1,4)
PATH 3 = HCOR(4K−3) + SCOR(I−1,3)
PATH 2 = HCOR(4K−2) + SCOR(I−1,2)
PATH 1 = HCOR(4K−1) + SCOR(I−1,1)

Block 2143 is then entered and SCOR(I,O) is set equal to the maximum of the PATH 1 through PATH 4 calculations. Diamond 2144 is then entered and inquiry is made as to whether PATH 1 yielded the maximum correlation score (among the 4 PATHs). If so, block 2145 is entered and pointer array point SPNT(K,I) is set equal to 1. Diamonds 2146, 2148 and 2150 and associated blocks 2147, 2149 and 2151 are then entered, depending upon which PATH yielded the maximum correlation score. In accordance with these determinations, the pointer array SPNT(K,I) is set to the appropriate value (1,2,3 or 4). The value of I is then incremented (block 2152) and I is tested to see if it is greater than IEN (diamond 2153). If not, loop 2141 is continued as the next point (K,I) is processed. If so, however, block 2154 is entered and K is incremented. Inquiry is then made (diamond 2155) as to whether or not K exceeds the number of word segments in the string being processed. If not, block 2132 is reentered, the SCOR array is shifted, and the next speech segment is processed, as described. If so, however, the next portion of the routine, beginning with block 2161, is entered.

Before proceeding further with the description of the string matching routine, the operation of loop 2141 can be better understood by making reference to the example set forth in FIG. 15, wherein it is assumed that the point (K,I) being computed is (8,5); i.e., assume that the current segment is the eighth segment within the string of word segments and is (part of or all of) the fifth word of the string. (This will be obtained in the pass through the processing loop 2141 for K=8, I=5). In a word versus segment plot (e.g. FIG. 11 or FIG. 12) the point for which an overall path score is being computed is the point (8,5). It is readily seen that the possible paths to this point (from a just previous point) are from points (4,4), (5,4), (6,4), and (7,4). The best scores to each of these points will have been previously calculated and shifted within the SCOR array to be at the positions illustrated in the example of FIG. 15. To the scores at each of these four positions will be added the appropriate weighted HCOR scores associated with the eighth segment (i.e., in each of the four cases, considering the eighth segment as the last segment of a word); viz., HCOR(4K-4) for PATH4, HCOR(4K-3) for PATH3, HCOR(4K-2) for PATH2, and HCOR(4K-1) for PATH1. For K=8, the scores associated with the four paths are HCOR(28), HCOR(29), HCOR(30), and HCOR(31). The highest overall score is determined (block 2143) and entered at position (5,0) of the SCOR array; i.e., the position illustrated in the example of FIG. 15 as holding the score "best to (8,5)". Also, 2144-2151 of the loop 2141 are used to enter in the pointer array SPNT an appropriate value (i.e., a number from 1 to 4) that indicates which overall path was found to yield the maximum overall correlation from among four origination points (4,4), (5,4), (6,4), and (7,4). Afterwards, when I is incremented (block 2152), the entry for position (6,0) of the SCOR array is computed in similar manner, this entry representing the best overall score to point (8,6) of the segment vs. word plot.

When the diamond 2155 indicates that the last segment of the string has been processed, the next portion of the string matching routine is used for finding the best final point in the word vs. segment plot (i.e., the point in the column representative of the last segment which gives the best correlation score to this column) and then for tracing back from this point to the origin, in a manner dictated by the pointer array (SPNT) to identify the sequence of words which gives the optimum correlation for the string of speech segments under consideration. In particular, index I is initialized at IST (block 2161) and a variable, designated MAX, used to keep track of the maximum correlation score in the last column of the segment vs. word plot (i.e., the "0" column of the SCOR array), is initialized at 0. Diamond 2163 is then entered, and inquiry is made as to whether SCOR(I,O), is greater than MAX. If so, MAX is set equal to SCOR(I,O), as indicated by block 2164. Also, a variable designated IMAX, which is used to keep track of the I associated with the highest correlation, is set equal to I. Block 2165 is then entered (and is also directly entered via the "no" output branch of diamond 2163), and I is incremented. Inquiry is then made as to whether or not I is greater than the upper limit, IEN (diamond 2166). If not, the loop 2168 is continued for all I's in the "0" column of the SCOR array. Therefore, after completion the loop 2168 IMAX will be equal to the particular I which resulted in the highest correlation stored at the last speech segment of the string being processed.

Having identified the last point of the segment vs. word plot which provides the optimum correlation, the pointer array is next used to trace back through the optimum path, and the array HWRD is used to identify the individual words within the optimum string. Block 2171 is entered and index L is initialized at 1 and index K is initialized at the number of speech segments in the string. Block 2172 is next entered and a variable IPATH is set equal to SPNT(K,IMAX); i.e., IPATH is set equal to the pointer array value (1,2,3 or 4) stored in the pointer array for the point (K,IMAX). A variable HS is then set equal to HCOR(4K-IPATH), as indicated by block 2173. This means that HS is set equal to the correlation score for the path in question, the correlation score being obtained from the array HCOR. (It will be recalled from FIG. 10 that the array HCOR is arranged with four correlation scores for each speech segment of the string, with each correlation score for a particular speech segment being representative of one of the four possible paths which include that segment as the last segment of a word.) Diamond 2174 is then entered and determination is made as to whether or not HS exceeds a predetermined reject threshold. This reject threshold can be utilized to insure that each word found within the string provides at least a minimum acceptable correlation with one of the vocabulary words stored during the training phase. If the threshold criterion is not met, block 2175 is entered and WHA(L) is set equal to $-1$; where $-1$ is a code that is used hereinbelow to indicate that a "reject" condition should be output at the position of word L of the string. If the criterion is met, however, block 2176 is entered, and WHA(L) is set equal to HWRD(4K-IPATH). In other words, the word to be output as word L of the string is retrieved from the HWRD array at the position (4K-IPATH). Block 2177 is then entered and the following incrementing is performed: L is incremented by 1, K is set equal to (K-IPATH), and IMAX is decremented by 1. In other words, the output word index L is incremented, the speech segment index K is decremented by the number of speech segments used in forming the previous word (IPATH, as was derived from SPNT), and the index indicating the number of words remaining in the string, IMAX, is decremented. Diamond 2178 is next entered and IMAX is tested to see if it is zero. If not, block 2172 is reentered and the loop 2179 is continued as each word in the string (or reject indication at a word position, as appropriate) is identified.

When the inquiry of diamond 2178 indicates that the final speech segment of the string has been processed (actually, it is the first speech segment of the string that is processed last by loop 2179, since the procedure, at this point, is backing through the string), diamond 2180 is entered and WHA(L) is tested to see if it is $-1$ (i.e., the code for a "reject" condition). If so, block 2181 is entered and a reject indication is output, such as to display an appropriate reject indication on display 150 (FIG. 1), to light a reject light, etc. If the inquiry of diamond 2180 is answered in the negative, however, word number WHA(L) is output as the first output word of the string (block 2182). Typically, the output indication may be in the form of a digital signal representative of the word number (e.g. a word number from 1 to 30 for a thirty word vocabulary). This output code can be used to generate an output on display 150 and to control operation of a companion system, as indicated in FIG. 1. The block 2183 is next entered and index L is decremented. L is then tested (diamond 2184) to determine if it is zero. If not, loop 2185 is continued until all words of the string have been output. Block 2186 is then entered and an output indication is generated to indicate that the next string of speech is awaited. This output indication can be used, for example, to strobe the companion system to expect the next informational input and/or to increment the presentation line of display 150. In the present embodiment the block 2186 is also directly entered from the output of block 2181, so that once a reject is indicated, the remainder of the string is not output. It will be understood, however, that if desired, the remainder of the string could be output after a reject by having the output of block 2181 be input to diamond 2184. Block 1913 of the recognize routine (FIG. 19) is then reentered.

Figure 23A:
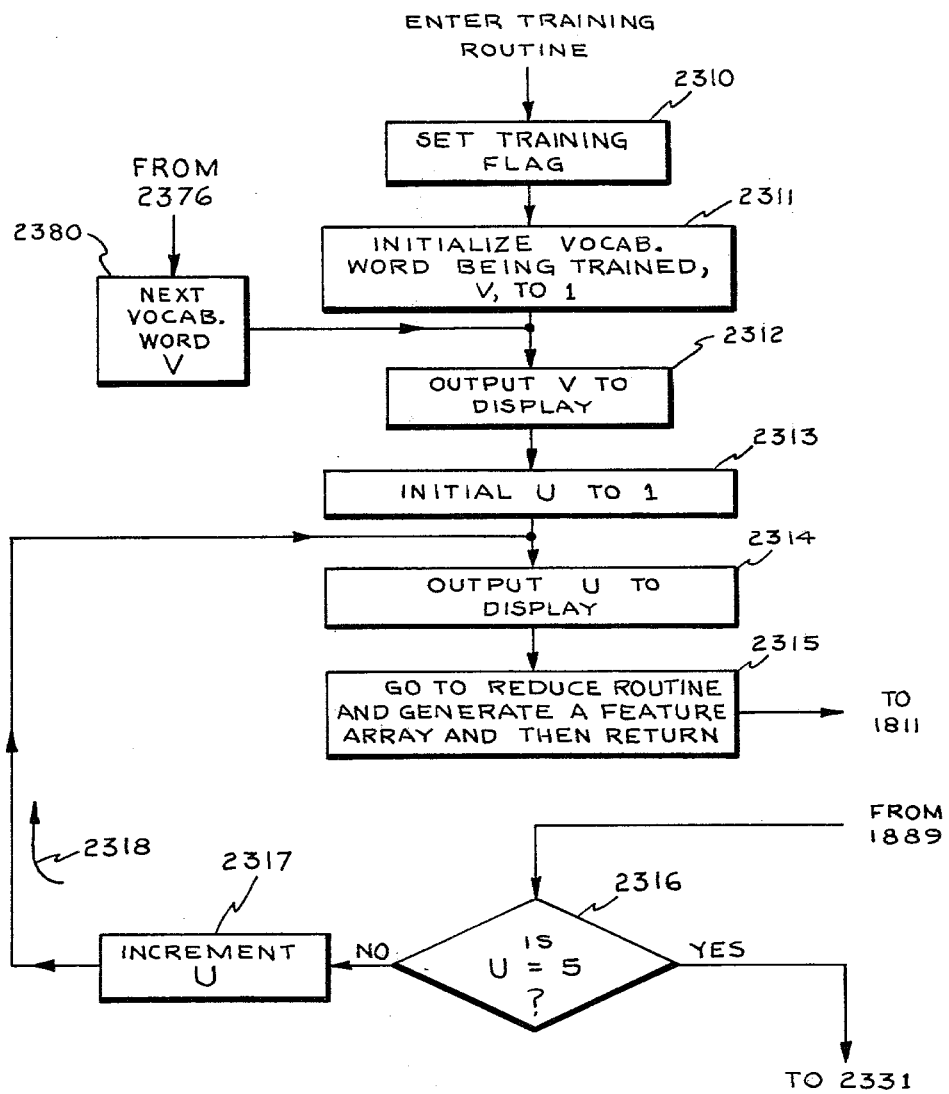
FIGS. 23A, 23B, and 23C together show a flow diagram of the training routine of FIG. 5.
Figure 23B:
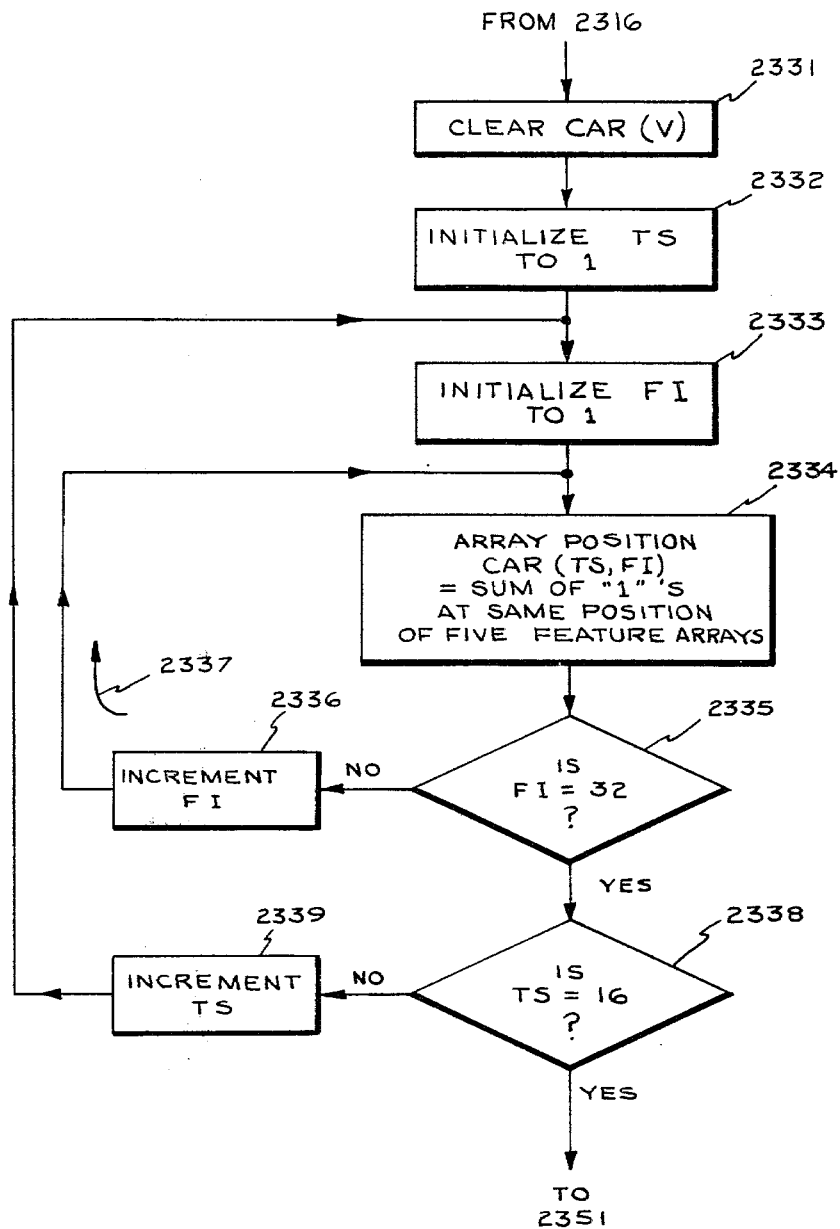
Figure 23C:
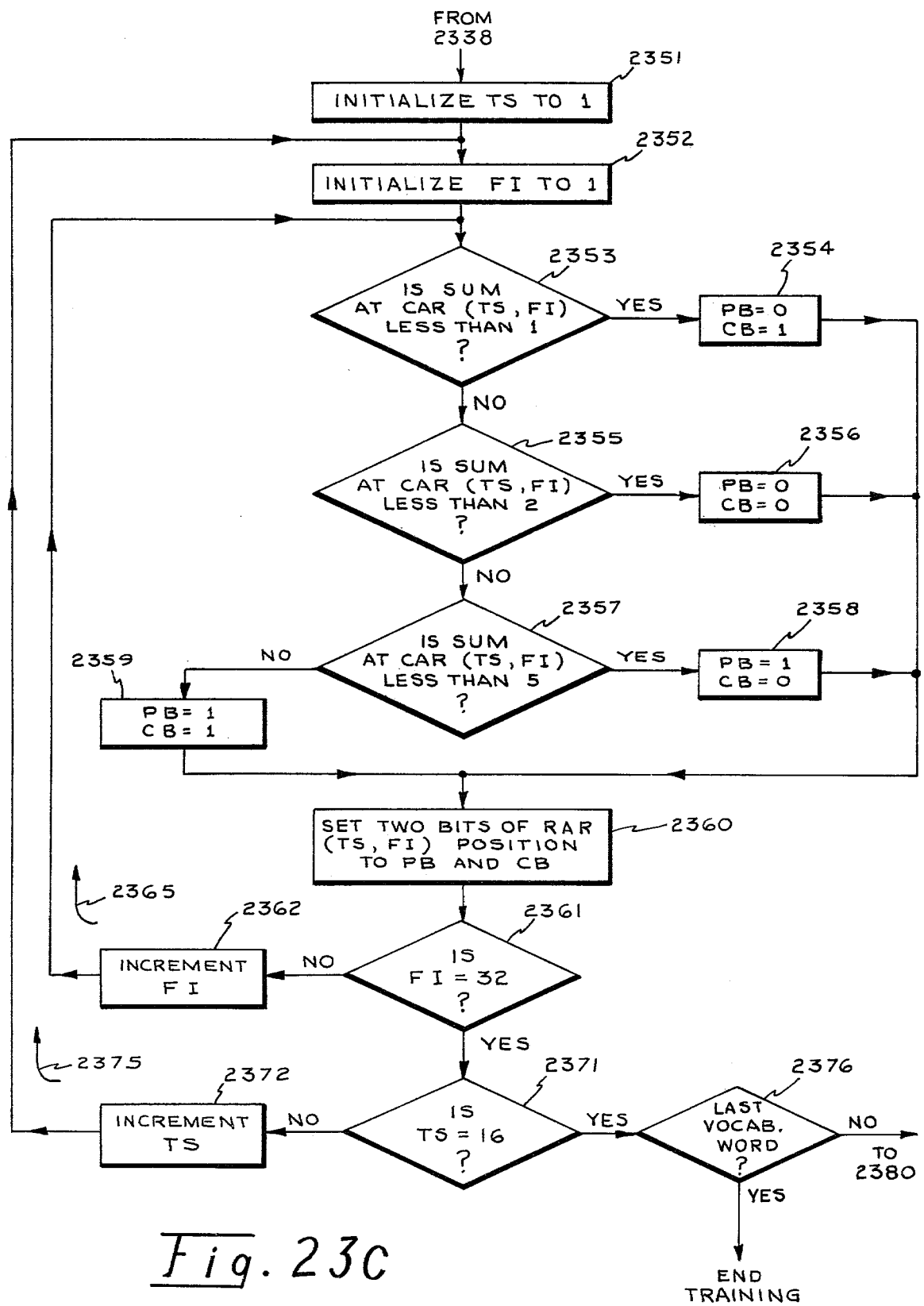

Referring to FIG. 23, there is shown a flow diagram of the training routine represented by block 550 of FIG. 5 and used in the present embodiment when generating the time-normalized reference arrays (RARs) used to represent the vocabulary words stored during the training phase of operation. When the training phase of operation is activated (typically, by an operator via a keyboard input), the routine is entered and the training flag is set (block 2310). The index V of the vocabulary word to be "trained" is initialized at 1 (block 2311). This index number can then be output on display 150 for convenience of the speaker during the training (block 2312). Also, if desired, the keyboard can be utilized to input the particular vocabulary word for storage in conjunction with the vocabulary word index number so that the actual vocabulary word can be displayed on the display 150 when the word is later recognized during the operational or "command" phase. An utterance count, U, is initialized at 1 (block 2313) and can also be displayed, if desired (block 2314). In the present embodiment each vocabulary word is spoken five times during the training phase, and the utterance count U is used to keep track of how many times a particular vocabulary word has been spoken. As represented by the block 2315, transfer is then effected to the reduce routine (FIG. 18) so that a feature array can be formed (and stored in FAR stack memory 521) for the first utterance of the vocabulary word to be spoken. (Of course, by virtue of the manner in which the reduce routine operates, as already described, the feature array for the training utterance will not be formed until after the service routine has operated to place information in input buffer memory 511 and boundary stack memory 512. The interrupts which continuously cause this to happen operate during the training phase as they do during the operational phase, as indicated by the arrows to and from block 550 of FIG. 5.) During the training phase, the reduce routine is used to generate a time-normalized feature array (of the type shown in FIG. 4), and one such feature array is formed for each utterance of the particular vocabulary word. The feature arrays for the number of utterances (five in the present embodiment) are then combined into a "cumulative array" from which the reference array ("RAR") for the vocabulary word is finally developed. The cumulative array is used, as will be seen, to determine how many times each feature occurred at each time slot during the five utterances of the vocabulary word. It will be understood that the formation of a feature array for a single vocabulary word spoken in isolation (as is the case during training) merely involves considering the "string" of received speech as a single word when forming a feature array for a training word utterance. This distinction in establishing boundaries for feature array formation is handled when preparing to form the feature array, as described in conjunction with a portion of the FIG. 18 routine (blocks 1841 to 1846 thereof) that will be described shortly hereinbelow.

After a feature array has been formed for a particular utterance U of the vocabulary word V, return is effected to diamond 2316 and inquiry is made as to whether or not U equals 5 (last utterance). If not, U is incremented (block 2317) and loop 2318 is continued until five feature arrays (for the five utterances of particular vocabulary word V) have been stored in the FAR stack memory 521.

When the loop 2318 is complete, block 2331 is entered to begin formation of a cumulative array for the vocabulary word by combining the five feature arrays obtained from the five utterances of the particular vocabulary word. The cumulative array to be formed for vocabulary word V is called CAR(V). The block 2331 represents the initial clearing of this array. The procedure is then begun of accumulating a sum of the "1"'s is found at each corresponding array position of the five feature arrays in the FAR stack memory. When this procedure is complete, the array CAR(V) will be a 32X16 array having a number between 0 and 5 at each array position. The procedure is implemented by initializing the time slot index TS to 1 (block 2332) and then initializing the feature index FI to 1 (block 2333). The array position CAR(TS,FI) is then set equal to the sum of the "1"'s at the corresponding array position (TS,FI) of the five feature arrays. This function is represented by the block 2334. The index FI is then tested (diamond 2335) to determine if all features of the present time slot have been considered. If not, index FI is incremented (block 2336) and the loop 2337 is continued. When all features have been considered, the time slot index TS is tested (diamond 2338) to determine if all time slots have been considered. If not, TS is incremented (block 2339) and the loop 2340 is continued until the array CAR(V) has been completely formed.

Having formed the cumulative array CAR(V), for the vocabulary word V, a 32X16 RAR having a "presence" bit and a "consistency" bit at each array position, is now formed by observing the sum at each array position of CAR(V). The "presence" bit and "consistency" bit are each assigned a binary value in accordance with the following rules: regarding the "presence" bit, in this embodiment the feature is considered as being present at a particular time slot if the count of the CAR is at least three; i.e., if a "1" was present at the particular feature array position in at least three out of the five utterances. Therefore, if the count at the CAR array position is 0, 1, or 2, the "presence" bit at that array position of the RAR being formed is set equal to "0", whereas if the count is 3, 4 or 5, the "presence" bit is set equal to "1". With regard to the "consistency" bit, a count of 0 in the CAR (reflecting consistent "0"'s at the array position for all five utterances), or a count of 5 in the CAR (reflecting consistent "1"'s at the array position for all five utterances) result in a "consistency" bit of "1", whereas other counts result in a "consistency" bit of "0". To achieve this generation of the RAR, block 2351 is entered and time slot index TS is initialized at 1 and then feature index FI is also initialized at 1 (block 2352). Inquiry is then made (diamond 2353) as to whether or not the sum at CAR(TS,FI) is less than 1. If so, a "presence" bit indication, PB, is set equal to 0 and a "consistency" bit indication, CB, is set equal to 1 (block 2354). If the answer to the inquiry of diamond 2353 was "no", inquiry is then made (diamond 2355) as to whether or not the sum at the particular CAR array position is less than 2. If so, a CAR count of 1 is indicated, and the "presence" bit indication PB is set equal to 0 and the "consistency" bit indication CB is set equal to 1 (block 2356). If the answer to the inquiry of diamond 2355 was "no", diamond 2357 is entered, and inquiry is made as to whether or not the sum at the CAR array position is less than 5. If so, a CAR count of 3 or 4 is indicated and "presence" bit indicator PB is set equal to 1, while the "consistency" bit indicator CB is set equal to 0 (block 2358). If the answer to the inquiry of diamond 2357 was "no", however, a CAR count of 5 is revealed, so the "presence" bit indication PB is set equal to 1 and the "convenience" bit indication CB is also set equal to 1. The block 2360 is then entered (and is also entered from the outputs of blocks 2354, 2356, and 2358) and the two binary bits at the array position RAR(TS,FI) are set equal to the values PB and CB. Inquiry is then made (diamond 2361) as to whether or not all features have been considered. If not, the feature index is incremented (block 2362) and the loop 2365 is continued until all features have been considered. Then, inquiry is made (diamond 2371) as to whether or not all time slots have been considered. If not, the time slot index is incremented (block 2372) and the loop 2375 is continued until the entire RAR has been formed. Inquiry is then made (diamond 2376) as to whether the last vocabulary word has been trained. If so, the training routine is complete. If not, however, return is made to block 2380 which can be set up to either automatically increment to the next vocabulary word V, or to await operator input (e.g. from a keyboard) to indicate that the next vocabulary word V is to be trained.

Reference can now again be made to FIG. 18 for description of the blocks 1841–1846, which are used, during the training phase, to establish the beginning and the end of a "string" (which, during training, is a single word spoken in isolation) as being the boundaries for formation of the feature arrays to be formulated for individual utterances of vocabulary words. If the training flag is found to be set (diamond 1813), block 1841 is entered, and the next (first) segment beginning address is read from the boundary stack memory 512 and stored as the beginning of word indication "BOW" (used later in the reduce routine, as was previously described). The block 1842 is then entered and the next segment end address is read from the boundary stack memory and stored as the end of word indication "EOW". However, since the vocabulary word being trained may have more than one segment, this EOW may later be changed (via operation of the rest of the loop 1845 presently being described), so that what is finally left in EOW will be the segment end address of the last segment of the "string" (which is the last segment of a single word, in this case). In particular, a diamond 1843 is next entered, this diamond representing the inquiry as to whether or not there is new data in the boundary stack memory 512. If not, diamond 1843 is reentered and the small loop is continued until new data is put in the boundary stack memory by operation of the service routine. When new data is available, the boundary stack memory is read (block 1844) and determination is made as to whether or not a long pause ("000") was read. If so, the end of the "string" (i.e., the end of a single word, in this case) is indicated, and the proper address for the end of the word is in EOW (since this was stored as the segment end address of the last segment—block 1842). If the latest item in the boundary stack memory was not a long pause, block 1842 is reentered, and the loop 1845 continues until the end of the string, whereupon the proper word beginning address and end address will be stored in BOW and EOW, respectively, for use subsequently in the reduce routine, as already described.

The invention has been described with reference to a particular embodiment, but variations within the spirit and scope of the invention will occur to those skilled in the art. For example, it will be understood that, if desired, the array matching correlation technique used in comparing each FAR with each RAR could employ a technique wherein time warping of the array time bases is employed. As is known in the art, such time-warped array matching can be implemented using known dynamic programming techniques. In any event, the type of correlation weighting which makes use of scoring based on a "consistency" bit (as well as a bit indicating presence/absence of a feature) would be applicable to such dynamic programming array matching as well as other types of array matching. Further, it will be understood that techniques for adjusting the beginning of word and end of word boundaries when forming arrays (e.g. feature arrays and/or reference arrays) of the type illustrated in FIG. 4 can employ known techniques for adjusting the time boundary of the beginning and/or end of a word candidates, as disclosed in the U.S. Pat. No. 4,032,710 assigned to the same assignee as the present application.

I claim:

1. Apparatus for receiving input spoken vocabulary words during a training phase of operation and for subsequently recognizing strings of received input spoken command words, comprising:

feature extraction means for generating digital feature signals dependent on the features present in input words;

reference array formation means for forming and storing, for each vocabulary word, a time-dependent reference array dependent on the feature signals present during the vocabulary word as spoken during the training phase;

boundary detection means for detecting relatively long duration pauses between speech sounds as inter-string pauses from which string boundaries are determined, the string boundaries defining the beginning and end of a string of words, and for detecting relatively short duration pauses between speech sounds as inter-segment pauses from which speech segment boundaries are determined within a string of words;

candidate feature array formation means for forming and storing, for each command word candidate consisting of each segment and each sequence of up to a predetermined number of segments, a time-dependent candidate feature array dependent upon the feature signals present during said command word candidate;

array correlation means for comparing each candidate feature array with each reference array and for storing, for each command word candidate, the vocabulary word whose reference array results in the highest correlation and a record of the score of said highest correlation;

string matching means responsive to the stored correlation scores for determining the sequence of vocabulary words that yields the highest overall correlation score for the string; and means for generating output indications of the determined sequence of vocabulary words.

2. Apparatus as defined by claim 1 wherein said reference array formation means and said candidate feature array formation means are operative to form time-normalized arrays.

3. Apparatus as defined by claim 1 wherein said candidate feature array formation means is operative to form a candidate feature array for each of the following: a command word candidate consisting of each individual speech segment considered as a one segment word; a command word candidate consisting of each individual speech segment together with the previous speech segment, if any, considered as a two segment word; a command word candidate consisting of each individual speech segment together with the previous two speech segments, if any, considered as a three segment word; and a command word candidate consisting of each individual speech segment together with the previous three speech segments, if any, considered as a four segment word.

4. Apparatus as defined by claim 2 wherein said candidate feature array formation means is operative to form a candidate feature array for each of the following: a command word candidate consisting of each individual speech segment considered as a one segment word; a command word candidate consisting of each individual speech segment together with the previous speech segment, if any, considered as a two segment word; a command word candidate consisting of each individual speech segment together with the previous two speech segments, if any, considered as a three segment word; and a command word candidate consisting of each individual speech segment together with the previous three speech segments, if any, considered as a four segment word.

5. Apparatus as defined by claim 1 wherein said string matching means is operative to identify, at each segment of a string, the sequence of vocabulary words which provides the highest overall correlation up to that particular segment of the string when considering said particular segment and all previous segments of the string as being part of sequences of different word lengths.

6. Apparatus as defined by claim 2 wherein said string matching means is operative to identify, at each segment of a string, the sequence of vocabulary words which provides the highest overall correlation up to that particular segment of the string when considering said particular segment and all previous segments of the string as being part of sequences of different word lengths.

7. Apparatus as defined by claim 4 wherein said string matching means is operative to identify, at each segment of a string, the sequence of vocabulary words which provides the highest overall correlation up to that particular segment of the string when considering said particular segment and all previous segments of the string as being part of sequences of different word lengths.

8. Apparatus as defined by claim 5 wherein said string matching means is also operative to store the highest overall correlation scores up to each segment, said scores being used in determining the highest overall correlation scores to subsequent segments.

9. Apparatus as defined by claim 6 wherein said string matching means is also operative to store the highest overall correlation scores up to each segment, said scores being used in determining the highest overall correlation scores to subsequent segments.

10. Apparatus as defined by claim 7 wherein said string matching means is also operative to store the highest overall correlation scores up to each segment, said scores being used in determining the highest overall correlation scores to subsequent segments.

11. Apparatus for receiving input spoken vocabulary words during a training phase of operation and for subsequently recognizing strings of received input spoken command words, comprising:

feature extraction means for generating digital feature signals dependent on the features present in input words;

reference array formation means for forming and storing, for each vocabulary word, a time-dependent reference array dependent on the feature signals present during the vocabulary word spoken during the training phase;

a feature buffer memory for storing feature signals which occur over a period of time;

candidate feature array formation means, responsive to the stored feature signals, for forming, for each command word candidate consisting of a portion of the speech of a received string, a time dependent command word candidate feature array dependent on the feature signals present during said command word candidate;

a first-in-first-out feature array memory stack for storing said command word candidate feature arrays;

array correlation means responsive to feature arrays in said feature array memory stack for comparing, in order, each candidate feature array with each reference array to obtain the vocabulary word whose reference array results in the highest correlation;

a correlation result memory for storing a record of the vocabulary words which result in the highest correlation with each candidate feature array, and for storing a record of the score of said highest correlation;

string matching means responsive to the correlation scores and vocabulary words stored in said correlation result memory for determining the sequence of vocabulary words that yields the highest correlation score for the string; and means responsive to said string matching means for generating output indications of the determined sequence of vocabulary words;

said array formation means, array correlation means, and string matching means being operative to function one at a time on a priority basis, with said array formation means having a higher operational priority than said array correlation means, and said array correlation means having a higher operational priority than said string matching means.

12. Apparatus as defined by claim 11 further comprising feature sampling means for periodically sampling said digital feature signals and storing said feature signals in said feature buffer memory, said sampling being implemented on an interrupt basis that has highest operational priority.

13. Apparatus as defined by claim 11 further comprising:

boundary detection means for detecting boundaries defining the beginning and end of a string of input words and for detecting boundaries between speech segments within a string; and a first-in-first-out boundary stack memory for storing the detected boundaries;

said array formation means being operative to define command word candidates in terms of the boundaries stored in said boundary stack memory.

14. Apparatus as defined by claim 12 further comprising:

boundary detection means for detecting boundaries defining the beginning and end of a string of input words and for detecting boundaries between speech segments within a string; and a first-in-first-out boundary stack memory for storing the detected boundaries;

said array formation means being operative to define command word candidates in terms of the boundaries stored in said boundary stack memory.

15. Apparatus as defined by claim 12 wherein said boundary stack memory is operative to store said boundaries as the addresses of feature signal samples stored in said feature buffer memory.

16. Apparatus as defined by claim 14 wherein said boundary stack memory is operative to store said boundaries as the addresses of feature signal samples stored in said feature buffer memory.

17. Apparatus as defined by claim 15 wherein said reference array formation means and said candidate feature array formation means are operative to form time-normalized arrays.

18. Apparatus as defined by claim 16 wherein said reference array formation means and said candidate feature array formation means are operative to form time-normalized arrays.

19. Apparatus as defined by claim 17 wherein said candidate feature array formation means is operative to form a candidate feature array for each of the following: a command word candidate consisting of each individual speech segment considered as a one segment word; a command word candidate consisting of each individual speech segment together with the previous speech segment, if any, considered as a two segment word; a command word candidate consisting of each individual speech segment together with the previous two speech segments, if any, considered as a three segment word; and a command word candidate consisting of each individual speech segment together with the previous three speech segments, if any, considered as a four segment word.

20. Apparatus as defined by claim 18 wherein said candidate feature array formation means is operative to form a candidate feature array for each of the following: a command word candidate consisting of each individual speech segment considered as a one segment word; a command word candidate consisting of each individual speech segment together with the previous speech segment, if any, considered as a two segment word; a command word candidate consisting of each individual speech segment together with the previous two speech segments, if any, considered as a three segment word; and a command word candidate consisting of each individual speech segment together with the previous three speech segments, if any, considered as a four segment word.

21. Apparatus as defined by claim 19 wherein said string matching means is operative to identify, at each segment of a string, the sequence of vocabulary words which provides the highest overall correlation up to that particular segment of the string when considering said particular segment and all previous segments of the string as being part of sequences of different word lengths.

22. Apparatus as defined by claim 20 wherein said string matching means is operative to identify, at each segment of a string, the sequence of vocabulary words which provides the highest overall correlation up to that particular segment of the string when considering said particular segment and all previous segments of the string as being part of sequences of different word lengths.

23. Apparatus as defined by claim 21 wherein said string matching means is also operative to store the highest overall correlation scores up to each segment, said scores being used in determining the highest overall correlation scores to subsequent segments.

24. Apparatus as defined by claim 22 wherein said string matching means is also operative to store the highest overall correlation scores up to each segment, said scores being used in determining the highest overall correlation scores to subsequent segments.

25. Apparatus as defined by claim 13 wherein said boundary detection means is operative to detect relatively long duration pauses between speech sounds as inter-string pauses from which the string boundaries are determined, and is operative to detect relatively short duration pauses between speech sounds as inter-segment pauses from which the speech segment boundaries are determined.

26. Apparatus as defined by claim 14 wherein said boundary detection means is operative to detect relatively long duration pauses between speech sounds as inter-string pauses from which the string boundaries are determined, and is operative to detect relatively short duration pauses between speech sounds as inter-segment pauses from which the speech segment boundaries are determined.

27. Apparatus as defined by claim 23 wherein said boundary detection means is operative to detect relatively long duration pauses between speech sounds as inter-string pauses from which the string boundaries are determined, and is operative to detect relatively short duration pauses between speech sounds as inter-segment pauses from which the speech segment boundaries are determined.

28. Apparatus as defined by claim 24 wherein said boundary detection means is operative to detect relatively long duration pauses between speech sounds as inter-string pauses from which the string boundaries are determined, and is operative to detect relatively short duration pauses between speech sounds as inter-segment pauses from which the speech segment boundaries are determined.

29. A method for receiving input spoken vocabulary words during a training phase of operation and for subsequently recognizing strings of received input spoken command words, comprising the steps of:

generating digital feature signals dependent on the features present in input words;

forming and storing, for each vocabulary word, a time-dependent reference array dependent on the feature signals present during the vocabulary word as spoken during the training phase;

detecting relatively long duration pauses between speech sounds as inter-string pauses from which string boundaries are determined, the string boundaries defining the beginning and end of a string of words, and detecting relatively short duration pauses between speech sounds as inter-segment pauses from which speech segment boundaries are determined within a string of words;

forming and storing, for each command word candidate consisting of each segment and each sequence of up to a predetermined number of segments, a time-dependent candidate feature array dependent upon the feature signals present during said command word candidate;

comparing each candidate feature array with each reference array and storing, for each command word candidate, the vocabulary word whose reference array results in the highest correlation and a record of the score of said highest correlation;

determining, using the stored correlation scores and words, the sequence of vocabulary words that yields the highest overall correlation score for the string; and generating output indications of the determined sequence of vocabulary words.

30. The method as defined by claim 29 wherein said reference array formation and said candidate feature array formation comprise forming time-normalized arrays.

31. The method as defined by claim 29 wherein said candidate feature array formation includes forming a candidate feature array for each of the following: a command word candidate consisting of each individual speech segment considered as a one segment word; a command word candidate consisting of each individual speech segment together with the previous speech segment, if any, considered as a two segment word; a command word candidate consisting of each individual speech segment together with the previous two speech segments, if any, considered as a three segment word; and a command word candidate consisting of each individual speech segment together with the previous three speech segments, if any, considered as a four segment word.

32. The method as defined by claim 30 wherein said candidate feature array formation includes forming a candidate feature array for each of the following: a command word candidate consisting of each individual speech segment considered as a one segment word; a command word candidate consisting of each individual speech segment together with the previous speech segment, if any, considered as a two segment word; a command word candidate consisting of each individual speech segment together with the previous two speech segments, if any, considered as a three segment word; and a command word candidate consisting of each individual speech segment together with the previous three speech segments, if any, considered as a four segment word.

33. The method as defined by claim 29 wherein said string matching includes identifying, at each segment of a string, the sequence of vocabulary words which provides the highest overall correlation up to that particular segment of the string when considering said particular segment and all previous segments of the string as being part of sequences of different word lengths.

34. The method as defined by claim 30 wherein said string matching includes identifying, at each segment of a string, the sequence of vocabulary words which provides the highest overall correlation up to that particular segment of the string when considering said particular segment and all previous segments of the string as being part of sequences of different word lengths.

35. The method as defined by claim 32 wherein said string matching includes identifying, at each segment of a string, the sequence of vocabulary words which provides the highest overall correlation up to that particular segment of the string when considering said particular segment and all previous segments of the string as being part of sequences of different word lengths.

36. The method as defined by claim 33 wherein said string matching also includes storing the highest overall correlation scores up to each segment, said scores being used in determining the highest overall correlation scores to subsequent segments.

37. The method as defined by claim 34 wherein said string matching also includes storing the highest overall correlation scores up to each segment, said scores being used in determining the highest overall correlation scores to subsequent segments.

38. The method as defined by claim 35 wherein said string matching also includes storing the highest overall correlation scores up to each segment, said scores being used in determining the highest overall correlation scores to subsequent segments.

* * * * *